(12) United States Patent
Jeon

(10) Patent No.: US 11,799,529 B2
(45) Date of Patent: Oct. 24, 2023

(54) DEVICE AND METHOD OF PERFORMING SUBCARRIER GROUPING AND/OR CODEBOOK SIZE SELECTION IN REAL-TIME FOR BEAMFORMING FEEDBACK AND WIRELESS COMMUNICATION SYSTEM INCLUDING THE SAME

(71) Applicant: Samsung Electronics Co., Ltd., Suwon-si (KR)

(72) Inventor: Eunsung Jeon, Seoul (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 15 days.

(21) Appl. No.: 17/550,172

(22) Filed: Dec. 14, 2021

(65) Prior Publication Data

US 2022/0190896 A1    Jun. 16, 2022

(30) Foreign Application Priority Data

Dec. 16, 2020   (KR) .................. 10-2020-0175971
May 3, 2021   (KR) .................. 10-2021-0057239

(51) Int. Cl.
*H04B 7/06*  (2006.01)
*H04B 7/0456*  (2017.01)
*H04L 5/00*  (2006.01)

(52) U.S. Cl.
CPC ......... *H04B 7/0617* (2013.01); *H04B 7/0456* (2013.01); *H04B 7/0632* (2013.01); *H04B 7/0639* (2013.01); *H04L 5/0094* (2013.01)

(58) Field of Classification Search
CPC .. H04B 7/0617; H04B 7/0456; H04B 7/0632; H04B 7/0639; H04L 5/0094
USPC ........................................... 375/267
See application file for complete search history.

(56) References Cited

U.S. PATENT DOCUMENTS

| | | | |
|---|---|---|---|
| 9,755,795 B2 | 9/2017 | Aboul-Magd et al. | |
| 10,411,849 B2 | 9/2019 | Porat et al. | |
| 10,680,683 B2 | 6/2020 | Yun et al. | |
| 10,686,641 B2 | 6/2020 | Liu et al. | |
| 10,771,139 B2 | 9/2020 | Lee et al. | |
| 2002/0136287 A1* | 9/2002 | Heath | H04L 1/24 375/228 |

(Continued)

FOREIGN PATENT DOCUMENTS

| | | | |
|---|---|---|---|
| KR | 102048678 B1 | 11/2019 | |
| KR | 20200005028 A | 1/2020 | |
| WO | WO-2009131376 A2 * | 10/2009 | ........... H04B 7/0417 |

*Primary Examiner* — Leila Malek

(74) *Attorney, Agent, or Firm* — Harness, Dickey & Pierce, P.L.C.

(57) ABSTRACT

A beamformee device includes processing circuitry configured to obtain channel information associated with a plurality of subcarriers based on a null data packet (NDP) received through a channel from a beamformer device, measure a variation on a frequency of the channel based on the channel information, determine a grouping size value based on the variation, select one or more first subcarriers among the plurality of subcarriers based on the grouping size value, select first channel information among the channel information based on the one or more first subcarriers, generate a beamforming feedback report based on the first channel information, and transmit the beamforming feedback report to the beamformer device.

20 Claims, 13 Drawing Sheets

(56) References Cited

U.S. PATENT DOCUMENTS

| | | |
|---|---|---|
| 2008/0181335 A1 | 7/2008 | Ponnampalam et al. |
| 2013/0010889 A1* | 1/2013 | Ponnampalam ....... H04B 7/066 |
| | | 375/267 |
| 2018/0013592 A1* | 1/2018 | Liu .................... H04L 25/0208 |
| 2018/0292518 A1* | 10/2018 | Chu .................... H04W 72/121 |
| 2019/0372638 A1 | 12/2019 | Lee et al. |
| 2020/0091970 A1 | 3/2020 | Lee et al. |
| 2020/0112353 A1* | 4/2020 | Liu ..................... H04B 7/0658 |
| 2020/0266858 A1 | 8/2020 | Yun et al. |

* cited by examiner

FIG. 5A

| SNR | SNR_1 | SNR_2 | ... | SNR_K |
|---|---|---|---|---|
| THRESHOLD | TH_1v | TH_2v | ... | TH_Kv |

FIG. 5B

| SNR | SNR_1 | SNR_2 | ... | SNR_K |
|---|---|---|---|---|
| THRESHOLD | TH_1d | TH_2d | ... | TH_Kd |

FIG. 6A

| SNR | SNR_1 | SNR_2 | ... | SNR_K |
|---|---|---|---|---|
| THRESHOLD1 | TH1_1v | TH1_2v | ... | TH1_Kv |
| THRESHOLD2 | TH2_1v | TH2_2v | ... | TH2_Kv |

FIG. 6B

| SNR | SNR_1 | SNR_2 | ... | SNR_K |
|---|---|---|---|---|
| THRESHOLD1 | TH1_1d | TH1_2d | ... | TH1_Kd |
| THRESHOLD2 | TH2_1d | TH2_2d | ... | TH2_Kd |

FIG. 10

|  | SU | | MU | | |
|---|---|---|---|---|---|
|  | CB1_SU | CB2_SU | CB1_MU | CB2_MU | CB3_MU |
| CASE1 | {2,4} | {4,6} | {5,7} | {7,9} | - |
| CASE2 | {2,4} | {4,6} | {5,7} | {7,9} | {9,11} |

# DEVICE AND METHOD OF PERFORMING SUBCARRIER GROUPING AND/OR CODEBOOK SIZE SELECTION IN REAL-TIME FOR BEAMFORMING FEEDBACK AND WIRELESS COMMUNICATION SYSTEM INCLUDING THE SAME

CROSS-REFERENCE TO RELATED APPLICATION

This application claims priority under 35 USC § 119 to Korean Patent Application No. 10-2020-0175971 filed on Dec. 16, 2020, and to Korean Patent Application No. 10-2021-0057239 filed on May 3, 2021, in the Korean Intellectual Property Office (KIPO), the contents of which are herein incorporated by reference in their entirety.

BACKGROUND

1. Technical Field

Example embodiments relate generally to semiconductor integrated circuits, and more particularly to devices and methods of performing subcarrier grouping and/or codebook size selection in real-time for beamforming feedback, and wireless communication systems including the devices.

2. Description of the Related Art

In a wireless communication system, it is important to have a strong communication signal. In particular, the greatest possible signal-to-noise ratio (SNR) is desired at a receiver end. Similarly, for a wireless fidelity (WiFi) system, increasing the SNR at the receiving device increases the probability that frames are correctly received and reduces the amount of retransmissions from the source. Some methods of achieving better SNR at the receiver end are to increase transmit power, decrease the distance between the source and the receiver, and increase antenna gain.

A signal may be transmitted based on a beamforming method in a wireless local area network (WLAN) system such as a WiFi system. In a wireless communication system, beamforming is a technique of a smart antenna, and is a technique for illuminating a beam of an antenna only to a corresponding terminal. A beamforming feedback should be preceded for a beamforming transmission, and various methods for providing efficient beamforming feedback have been researched.

SUMMARY

Example embodiments of the present disclosure provide a beamformee device capable of performing subcarrier grouping and/or codebook size selection in real-time to reduce the overhead of beamforming feedback.

Example embodiments of the present disclosure provide a wireless communication system including the beamformee device.

Example embodiments of the present disclosure provide a beamforming feedback method performed by the beamformee device.

According to example embodiments, a beamformee device includes processing circuitry configured to obtain channel information associated with a plurality of subcarriers based on a null data packet (NDP) received through a channel from a beamformer device, measure a variation on a frequency of the channel based on the channel information, determine a grouping size value based on the variation, select one or more first subcarriers among the plurality of subcarriers based on the grouping size value, select first channel information among the channel information based on the one or more first subcarriers, generate a beamforming feedback report based on the first channel information, and transmit the beamforming feedback report to the beamformer device.

According to example embodiments, a wireless communication system includes a beamformer device configured to transmit a null data packet (NDP) through a channel, and a beamformee device configured to obtain channel information associated with a plurality of subcarriers of the channel based on the NDP, measure a variation on a frequency of the channel based on the channel information, determine a grouping size value based on the variation, select one or more first subcarriers among the plurality of subcarriers based on the grouping size value, select first channel information among the channel information based on the one or more first subcarriers, generate a beamforming feedback report based on the first channel information, the beamforming feedback report representing a result of estimating the channel, and transmit the beamforming feedback report to the beamformer device.

According to example embodiments, a beamformee device includes processing circuitry configured to obtain channel information associated with a plurality of subcarriers based on a null data packet (NDP) received through a channel from a beamformer device, estimate an SNR of the channel, measure a variation on a frequency of the channel in real-time based on the channel information including calculating at least one of a variance of the frequency of the channel or a delay spread of the channel, select at least one threshold value based on the SNR, determine a grouping size value based on the at least one threshold value and the variation, select one or more first subcarriers among the plurality of subcarriers based on the grouping size value, select first channel information among the channel information based on the one or more first subcarriers, perform a singular value decomposition (SVD) on the first channel information, generate a beamforming feedback report by compressing a result of the SVD, and transmit the beamforming feedback report to the beamformer device.

According to example embodiments, a beamforming feedback method is provided, the method including obtaining channel information associated with a plurality of subcarriers of a channel by receiving a null data packet (NDP) from a beamformer device through the channel and estimating the channel based on the NDP, determining a grouping size value by measuring a variation on a frequency of the channel based on the channel information, generating a beamforming feedback report based on first channel information, the first channel information being selected from among the channel information based on one or more first subcarriers, and the one or more first subcarriers being selected from among the plurality of subcarriers based on the grouping size value, and transmitting a beamforming feedback report to the beamformer device.

According to example embodiments, a beamformee device includes processing circuitry configured to obtain channel information associated with a plurality of subcarriers based on a null data packet (NDP) received through a channel from a beamformer device, measure a variation on a frequency of the channel based on the channel information, determine a codebook size value based on the variation, generate a beamforming feedback report based on the codebook size value and the channel information, and transmit the beamforming feedback report to the beamformer device.

According to example embodiments, a beamforming feedback method is provided, the method includes obtaining channel information associated with a plurality of subcarriers of a channel by receiving a null data packet (NDP) from a beamformer device through the channel and estimating the channel based on the NDP, determining a codebook size value by measuring a variation on a frequency of the channel based on the channel information, generating a beamforming feedback report based on the codebook size value and the channel information, and transmitting the beamforming feedback report to the beamformer device.

In the beamformee device, the wireless communication system and the beamforming feedback method according to example embodiments, the subcarrier grouping and/or the codebook size selection may be applied or employed while the beamforming feedback is performed in the feedback mode. In particular, the subcarrier grouping and/or the codebook size selection in real-time may be applied or employed to adaptively set, determine and change the grouping size value and/or the codebook size value in consideration of the channel characteristics in real-time. Accordingly, the feedback overhead of the beamforming feedback may be efficiently reduced, and the beamforming feedback may be efficiently performed.

BRIEF DESCRIPTION OF THE DRAWINGS

Illustrative, non-limiting example embodiments will be more clearly understood from the following detailed description taken in conjunction with the accompanying drawings.

FIGS. 5A, 5B, 6A and 6B are diagrams for describing an operation of a selector included in a grouping size selector of FIG. 3.

FIGS. 10 and 11 are diagrams for describing a codebook size selection according to example embodiments.

DETAILED DESCRIPTION

Figure 1:
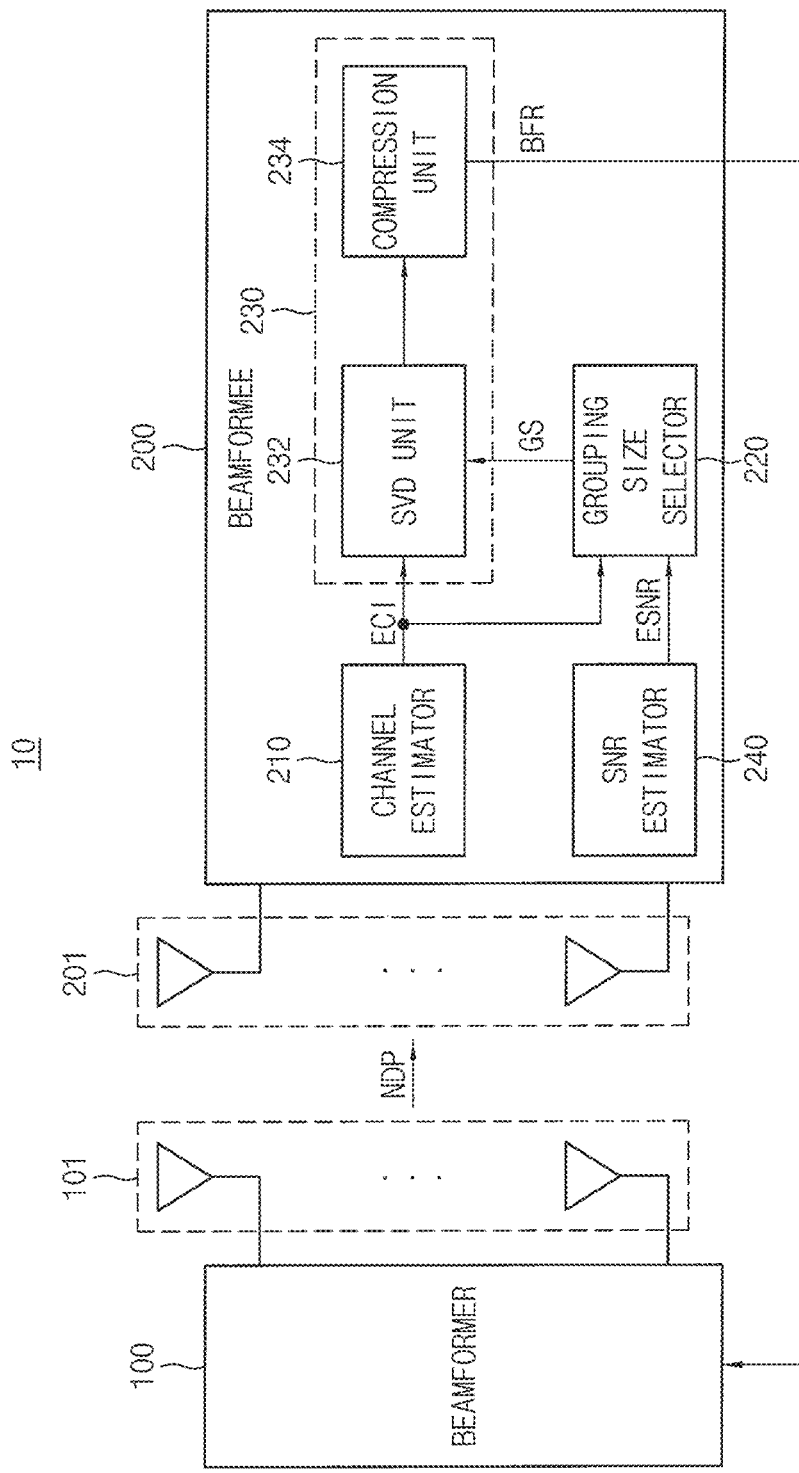
FIG. 1 is a block diagram illustrating a beamformee device and a wireless communication system including the beamformee device according to example embodiments.

Various example embodiments will be described more fully with reference to the accompanying drawings, in which example embodiments are shown. The present disclosure may, however, be embodied in many different forms and should not be construed as limited to example embodiments set forth herein. Like reference numerals refer to like elements throughout this application.

FIG. 1 is a block diagram illustrating a beamformee device and a wireless communication system including the beamformee device according to example embodiments.

Referring to FIG. 1, a wireless communication system 10 includes a beamformer device 100 and a beamformee device 200.

In example embodiments, the wireless communication system 10 may be a wireless communication system that is implemented or formed based on a wireless local area network (WLAN). For example, the wireless communication system 10 may be a wireless communication system that is implemented or formed based on a wireless fidelity (WiFi). For example, the WLAN system may be implemented based on the Institute of Electrical and Electronics Engineers (IEEE) 802.11ac standard or the IEEE 802.11ax standard, or may be implemented based on the IEEE 802.11be standard that is a next generation standard.

In the WLAN system, a beamforming transmission may be performed between the beamformer device 100 and the beamformee device 200. The beamforming transmission is one in which a beam of an antenna is directed and limited to a specific terminal in a multi-antenna orthogonal frequency division modulation (OFDM) system. The beamforming transmission may be divided into a technique of forming a transmission beam to increase a reception data rate of a single user (e.g., a single-user beamforming) and a technique of forming a transmission beam for mutual interference cancellation during simultaneous (or contemporaneous) transmission between multiple users (e.g., a multi-user beamforming). For the single-user (or multi-user) beamforming transmission, the beamformee device 200 may decode a packet transmitted for channel measurement from the beamformer device 100, may compress channel information based on a technique specified in the WLAN standard, and may feed the compressed channel information back to the beamformer device 100. The above-described operation of feeding back the channel information may be referred to as a beamforming feedback, and the beamforming feedback may be performed in a feedback mode.

Hereinafter, operations of the wireless communication system 10 and the beamformee device 200 according to example embodiments will be described based on operations for reducing feedback overhead when the beamforming feedback is performed in the feedback mode. However, example embodiments are not limited thereto, and the wireless communication system 10 may perform a normal beamforming transmission based on the channel information obtained by the beamforming feedback in a normal operation mode after the feedback mode.

The beamformer device 100 may transmit a null data packet (NDP) used to measure a channel or for channel measurement. The beamformer device 100 may be referred to as a transmitter or an access point (AP). According to example embodiments, the beamformer device 100 may be a base station. The base station may generally refer to a fixed station that communicates with user equipment and/or other base stations, and may exchange data and control information by communicating with user equipment and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range. The NDP may be referred to as a sounding packet.

The beamformer device 100 may include a plurality of antennas (e.g., transmission antennas) 101. The beamformer device 100 may transmit or output the NDP using the plurality of antennas 101. For example, the number of the plurality of antennas 101 may be $N_t$, where $N_t$ is a natural number greater than or equal to two.

The beamformee device 200 may receive the NDP from the beamformer device 100 through the channel, estimate the channel based on the NDP, and feed a beamforming feedback report BFR back to the beamformer device 100. The beamforming feedback report BFR represents or corresponds to a result of estimating the channel. The beamformee device 200 may perform a subcarrier grouping in real-time and/or online (or during runtime) to reduce the feedback overhead of the beamforming feedback, and thus feed back only channel information associated with a part of subcarriers, instead of channel information associated with all of the subcarriers. The beamformee device 200 may be referred to as a receiver or a station (STA).

The beamformee device 200 may include a channel estimator 210, a grouping size selector 220 and/or a feedback unit 230. The beamformee device 200 may further include a plurality of antennas (e.g., reception antennas) 201 and/or a signal-to-noise ratio (SNR) estimator 240.

The beamformee device 200 may receive the NDP from the beamformer device 100 through the channel using the plurality of antennas 201. For example, the number of the plurality of antennas 201 may be $N_r$, where $N_r$ is a natural number greater than or equal to two. The channel (e.g., a wireless channel) may be formed between the plurality of antennas 101 of the beamformer device 100 and the plurality of antennas 201 of the beamformee device 200.

The channel estimator 210 may obtain channel information ECI associated with or related to a plurality of subcarriers by estimating the channel based on the NDP. For example, separate channel information may be estimated and obtained for each subcarrier.

The grouping size selector 220 may measure a variation (or fluctuation) on a frequency of the channel based on the channel information ECI, and determine a grouping size value used to select at least a part of the plurality of subcarriers based on the measured variation. The grouping size selector 220 may generate a grouping size signal GS representing the grouping size value. For example, the variation on the frequency of the channel may represent a change in characteristics occurring on the channel. For example, as will be described with reference to FIG. 3, the variation on the frequency of the channel may be measured or obtained by calculating a variance of the frequency of the channel and/or by calculating a delay spread of the channel.

In example embodiments, the grouping size selector 220 may measure the variation on the frequency of the channel in real-time based on the channel information ECI, and may select and change the grouping size value in real-time based on the measured variation in real-time. The operation of selecting and changing the grouping size value in real-time may represent that the grouping size value is changeable or variable, whenever the beamforming feedback is performed, and in every frame of the beamforming feedback report BFR that is fed back by the beamformee device 200. In other words, the subcarrier grouping in real-time according to example embodiments may be performed by the grouping size selector 220, and thus the feedback overhead of the beamforming feedback may be reduced. The subcarrier grouping will be described with reference to FIG. 2. A detailed configuration of the grouping size selector 220 and a detailed operation of performing the subcarrier grouping in real-time will be described with reference to FIGS. 3, 4A, 4B, 4C, 4D, 5A, 5B, 6A and 6B.

The feedback unit 230 may select at least the part of the plurality of subcarriers based on the grouping size value (e.g., based on the grouping size signal GS), select at least a part of the channel information ECI based on the selected subcarriers, generate the beamforming feedback report BFR based on the selected channel information, and feed the beamforming feedback report BFR back to the beamformer device 100.

The feedback unit 230 may include a singular value decomposition (SVD) unit 232 and/or a compression unit 234.

The SVD unit 232 may select at least the part of (e.g., a portion of or sub-portion of) the plurality of subcarriers (e.g., selected first subcarriers) based on the grouping size value (e.g., based on the grouping size signal GS), may select at least the part of (e.g., a portion of or sub-portion of) the plurality of channel information ECI (e.g., selected first channel information) based on the selected subcarriers, and may perform an SVD on the selected channel information.

The compression unit 234 may generate the beamforming feedback report BFR based on the selected channel information (e.g., based on an output of the SVD unit 232). For example, the beamforming feedback report BFR may be generated by compressing the output of the SVD unit 232 based on the technique specified in the WLAN standard. A detailed configuration of the beamforming feedback report BFR will be described with reference to FIG. 7.

The SNR estimator 240 may estimate an SNR of the channel, and may generate an SNR signal ESNR representing the estimated SNR. As will be described with reference to FIGS. 5A, 5B, 6A and 6B, the estimated SNR (e.g., the SNR signal ESNR) may be used by the grouping size selector 220 to determine the grouping size value.

In the WLAN system, beamforming may increase antenna gain while maintaining omnidirectional coverage, which results in increased SNR and more stable, higher bandwidth WLAN connections by focusing transmissions to the recipient. These benefits may be achieved by transmitting a signal via an array of antennas and slightly altering the phase of the signal at each antenna in the array. For example, the IEEE 802.11ac standard (e.g., a wireless networking standard in the 802.11 family, developed by the IEEE Standards Association) may provide a protocol for calibrating an array of antennas to direct a signal to any point covered under omnidirectional propagation. The beamformer device 100 may be a device that augments the phase shift of antennas to produce a gain in a desired direction. The beamformee device 200 may be a device that is a target of the beamformer device 100. The beamformee device 200 may participate in the establishment of the beam, but may not augment timings of its antennas.

For the beamforming transmission in the WLAN system, the beamformer device 100 should first obtain the channel information (or channel state information) from the beamformee device 200. For obtaining the channel information, the beamformer device 100 may transmit an NDP announcement (NDPA) frame through the plurality of antennas 101, and then may transmit the NDP (or sounding packet) through the plurality of antennas 101. The beamformee device 200 may receive the NDP through the plurality of antennas 201 and may obtain the channel information based on the NDP. The received signals may represent a result of undergoing the channel, and a relationship between the transmitted signals and the received signals may satisfy Equation 1.

$$Y_k = H_k S_k + N_k \qquad \text{[Equation 1]}$$

In Equation 1, $Y_k$ denotes a vector of the received signals, $S_k$ denotes a vector of the transmitted signals (e.g., a vector of sounding signals), $H_k$ denotes a channel matrix representing the frequency response, $N_k$ denotes a noise vector, and k denotes a subcarrier index. Each of $Y_k$ and $N_k$ may be an $N_r*1$ vector, $S_k$ may be an $N_t*1$ vector, and $H_k$ may be an $N_r*N_t$ matrix. $N_t$ denotes the number of the plurality of antennas 101 of the beamformer device 100, and $N_r$ denotes the number of the plurality of antennas 201 of the beamformee device 200.

The beamformee device 200 may estimate channel information $\hat{H}_k$ for each subcarrier using the channel estimator 210, and the channel information $\hat{H}_k$ may correspond to one piece of the channel information ECI. In addition, when the beamformee device 200 operates in the feedback mode, the beamformee device 200 may perform, using the SVD unit 232, a singular value decomposition (SVD) on the channel information $\hat{H}_k$ based on Equation 2.

$$\hat{H}_k = U_k \Sigma_K V_k^H \qquad \text{[Equation 2]}$$

In Equation 2, each of $U_k$ and $V_k$ denotes an unitary matrix, $\Sigma_k$ denotes a diagonal matrix including channel singular values, and $V_k^H$ denotes a conjugate transpose matrix of $V_k$.

In the WLAN system, to reduce the feedback overhead, the beamformee device 200 may not directly feed back $V_k$. Instead, the beamformee device 200 may first obtain $Q_k$ by multiplying a diagonal matrix $$\tilde{D}(e^{-j\phi_{N_t,1}}, \ldots, e^{-j\phi_{N_t-1,N_{t-1}}})$$

for performing a common-phase shift by $V_k$ based on Equation 3, where is a phase value corresponding to an element in an i-th row and a j-th column of $V_k$.

$$Q_k = V_k \tilde{D} \qquad \text{[Equation 3]}$$

Subsequently, the beamformee device 200 may compress and feed back angle values φ and ψ corresponding to each element of $Q_k$ using Givens rotation. In other words, the beamformee device 200 may quantize, using the compression unit 234, the angle values φ and ψ obtained based on Equation 4, and may feed the quantized angle values back to the beamformer device 100.

$$Q_k = \qquad \text{[Equation 4]}$$

$$\left[ \prod_{i=1}^{min(N_r,N_t-1)} \left[ D_i(1_{i-1}, e^{j\phi_{i,i}}, \ldots, e^{j\phi_{N_t-1,i}}, 1) \prod_{l=i+1}^{N_t} G_{li}^T(\psi_{li}) \right] \right] \check{I}_{Nt \times Nr}$$

In Equation 4, $1_{i-1}$ may be a vector including elements of 1. In addition, $$D_i(1_{i-1}, e^{j\phi_{i,i}}, \ldots, e^{j\phi_{N_r-1,i}})$$

and the Givens rotation $G_{li}(\psi)$ may be defined as in Equation 5 and Equation 6, respectively.

$$D_i(1_{i-1}, e^{j\phi_{i,i}}, \ldots, e^{j\phi_{N_r-1,i}}, 1) = \begin{bmatrix} I_{i-1} & 0 & \ldots & \ldots & 0 \\ 0 & e^{j\phi_{i,i}} & 0 & \ldots & 0 \\ \vdots & 0 & \ddots & 0 & 0 \\ \vdots & \vdots & 0 & e^{j\phi_{N_r-1,i}} & 0 \\ 0 & 0 & 0 & 0 & 1 \end{bmatrix} \text{[Equation 5]}$$

$$G_{li}(\psi) = \begin{bmatrix} I_{i-1} & 0 & 0 & \ldots & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{Nt-1} \end{bmatrix} \text{[Equation 6]}$$

In other words, the beamforming feedback report BFR that is fed back from the beamformee device 200 to the beamformer device 100 may include the angle values φ and ψ for each subcarrier that are obtained based on Equation 4.

Figure 2:
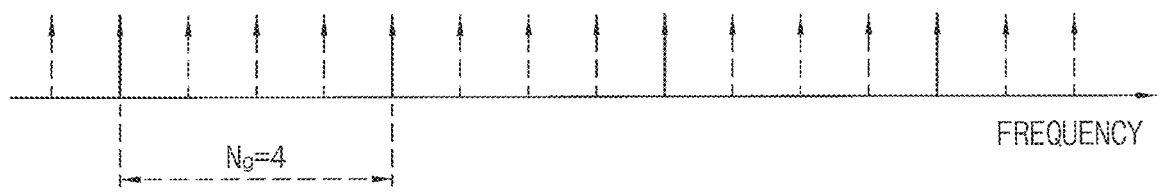
FIG. 2 is a diagram for describing a subcarrier grouping according to example embodiments.

FIG. 2 is a diagram for describing a subcarrier grouping according to example embodiments.

Referring to FIG. 2, the subcarrier grouping may be used in the IEEE 802.11ac standard and/or the IEEE 802.11ax standard that are WLAN standards, and will be used in the IEEE 802.11be standard that is a next generation standard.

The subcarrier grouping may be implemented based on correlation characteristics on the frequency of the channel. For example, as illustrated in FIG. 2, channel information (e.g., the angle values φ and ψ obtained based on Equation 4) associated with all of the subcarriers is not fed back, and only channel information associated with a part of the subcarriers may be fed back.

In example embodiments, when the grouping size value $N_g$ is determined, channel information corresponding to one subcarrier among the plurality of consecutive subcarriers may be fed back. For example, every $N_g$-th subcarrier may be selected from among the plurality of subcarriers based on the grouping size value $N_g$, and channel information associated with the selected subcarrier may be fed back.

In FIG. 2, one arrow represents one subcarrier, arrows illustrated by solid lines represent subcarriers to which corresponding channel information are fed back, and arrows illustrated by dotted lines represent subcarriers to which corresponding channel information are not fed back. FIG. 2 illustrates an example where the grouping size value $N_g$ is four and channel information associated with every fourth subcarrier is fed back.

In example embodiments, the grouping size value $N_g$ may be determined by the beamformer device 100 or the beamformee device 200. For example, in the single-user beamforming, the beamformee device 200 may set the grouping size value $N_g$ independently and/or by itself. For example, in the multi-user beamforming, the beamformer device 100 may set the grouping size value $N_g$ and may request it to the beamformee device 200, and the beamformee device 200 may feed back channel information based on the grouping size value $N_g$ requested by the beamformer device 100.

The wireless communication system 10 and the beamformee device 200 according to example embodiments may operate based on the single-user beamforming. For example, the beamformee device 200 may receive the NDP, and then may set the grouping size value $N_g$ in real-time based on the channel characteristics obtained by estimating the channel. However, example embodiments are not limited thereto. Alternatively, the wireless communication system 10 and the beamformee device 200 according to example embodiments may operate based on the multi-user beamforming, and the beamformer device 100 may set the grouping size value $N_g$ in a similar manner based on the result of estimating the channel.

In example embodiments, the beamformer device 100 may receive the channel information associated with the part of the subcarriers from the beamformee device 200 based on the grouping size value $N_g$, and may infer channel information associated with the remaining subcarriers using interpolation. In other words, the beamformer device 100 may obtain the selected channel information associated with the selected subcarriers based on the beamforming feedback report BFR, and may obtain channel information associated with subcarriers other than the selected subcarriers among the plurality of subcarriers by performing interpolation on the selected channel information. For example, the beamformer device 100 may include at least one processor that performs the above-described interpolation.

In the IEEE 802.11ac standard, examples where the grouping size value $N_g$ is one, two and four may be defined, and $N_g=1$ may represent an example where channel information associated with all of the subcarriers are fed back. In the IEEE 802.11ax standard, examples where the grouping size value $N_g$ is four and sixteen may be defined. In the IEEE 802.11be standard, the grouping size value $N_g$ is being discussed.

Figure 3:
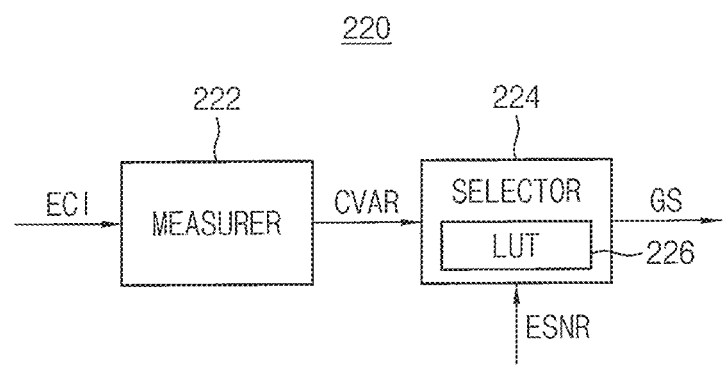
FIG. 3 is a block diagram illustrating an example of a grouping size selector included in a beamformee device of FIG. 1.

FIG. 3 is a block diagram illustrating an example of a grouping size selector included in a beamformee device of FIG. 1.

Referring to FIG. 3, a grouping size selector 220 may include a measurer 222 and a selector 224.

The measurer 222 may measure the variation on the frequency of the channel in real-time based on the channel information ECI, and may generate a variation signal CVAR representing the variation on the frequency of the channel.

In example embodiments, the measurer 222 may obtain the variation on the frequency of the channel by calculating a variance of the frequency of the channel.

For example, the variance of the frequency of the channel may be obtained based on Equation 7.

$$\sigma_H^2 = \frac{1}{N_r N_t} \sum_{i=0}^{N_r-1} \sum_{j=0}^{N_t-1} \left[ \frac{1}{N} \sum_{k=0}^{N-1} |\hat{H}_k(i,j)|^2 - \left(\frac{1}{N}\sum_{k=0}^{N-1}|\hat{H}_k(i,j)|\right)^2 \right]$$

[Equation 7]

In Equation 7, $\sigma_H^2$ denotes the variance of the frequency of the channel, $N_r$ denotes the number of the plurality of antennas 201 included in the beamformee device 200, $N_t$ denotes the number of the plurality of antennas 101 included in the beamformer device 100, N denotes the number of the plurality of subcarriers, $\hat{H}_k(i, j)$ denotes an (i,j)-th element (e.g., an element of an i-th row and a j-th column) in $\hat{H}_k$, which is one piece of the channel information ECI, and k denotes an index of the plurality of subcarriers.

For example, as the variance of the frequency of the channel obtained based on Equation 7 increases, it may be determined that the variation on the frequency of the channel increases, and as the variance of the frequency of the channel obtained based on Equation 7 decreases, it may be determined that the variation on the frequency of the channel decreases. In other words, the greater the variance of the frequency of the channel, the greater the variation on the frequency of the channel, and the less the variance of the frequency of the channel, the less the variation on the frequency of the channel.

In example embodiments, the measurer 222 may obtain the variation on the frequency of the channel by calculating a delay spread of the channel.

For example, the delay spread of the channel may be obtained based on Equation 8.

$$\tau_H = \frac{1}{N_r N_t} \sum_{i=0}^{N_r-1} \sum_{j=0}^{N_t-1} [IDFT\{\phi_\Delta(i,j)\}], \text{ where}$$

$$\phi_\Delta(i,j), E\{\hat{H}_k^*(i,j)\hat{H}_{k+\Delta}(i,j)\}$$

[Equation 8]

In the Equation 8, $\tau_H$ denotes the delay spread of the channel, $N_r$ denotes the number of the plurality of antennas 201 included in the beamformee device 200, $N_t$ denotes the number of the plurality of antennas 101 included in the beamformer device 100, denotes an (i,j)-th element (e.g., an element of an i-th row and a j-th column) in $\hat{H}_k(i,j)$ which is one piece of the channel information ECI, k denotes an index of the plurality of subcarriers, IDFT(.) denotes an inverse discrete Fourier transform (DFT) function, * denotes a complex conjugate operator, and E{.} denotes an arithmetic mean operator.

For example, as the delay spread of the channel obtained based on Equation 8 increases, it may be determined that the variation on the frequency of the channel increases, and as the delay spread of the channel obtained based on Equation 8 decreases, it may be determined that the variation on the frequency of the channel decreases. In other words, the greater the delay spread of the channel, the greater the variation on the frequency of the channel, and the less the delay spread of the channel, the less the variation on the frequency of the channel.

The selector 224 may select and change (e.g., update) the grouping size value $N_g$ in real-time based on at least one threshold value and the measured variation in real-time, and may generate the grouping size signal GS representing the grouping size value $N_g$.

In example embodiments, as the variation on the frequency of the channel increases, the selector 224 may select a smaller value as the grouping size value $N_g$, and as the variation on the frequency of the channel decreases, the selector 224 may select a larger value as the grouping size value. In other words, the greater the variation on the frequency of the channel, the less the grouping size value $N_g$, and the less the variation on the frequency of the channel, the greater the grouping size value $N_g$.

In example embodiments, the selector 224 may receive the SNR signal ESNR representing the estimated SNR of the channel from the SNR estimator 240. The selector 224 may select the at least one threshold value based on the estimated SNR, and may select the grouping size value $N_g$ based on the selected threshold value and the measured variation in real-time. For example, the grouping size value $N_g$ may be determined by comparing the measured variation in real-time with the selected threshold value.

In example embodiments, the selector 224 may include a look-up table (LUT) 226 that is preset, set in advance or alternatively, given. For example, the look-up table 226 may represent a relationship between the estimated SNR and the at least one threshold value. Examples of the look-up table 226 will be described with reference to FIGS. 5A, 5B, 6A and 6B.

In the wireless communication system 10 and the beamformee device 200 according to example embodiments, the beamformee device 200 may determine the grouping size value $N_g$ in real-time or online using the channel information obtained from the received NDP. In other words, the beamformee device 200 may variably and adaptively change the grouping size value $N_g$ depending on the channel condition. For example, a relatively small grouping size value $N_g$ may be used when the variation on the frequency of the channel estimated from the NDP is relatively large, and a relatively large grouping size value $N_g$ may be used when the variation on the frequency of the channel is relatively small. In addition, the variation may be measured by using the calculation based on the channel frequency response variance or the calculation based on the channel delay spread. In example embodiments, the above-described two calculations may be simultaneously, contemporaneously or concurrently used.

FIGS. 4A, 4B, 4C and 4D are diagrams for describing an operation of a grouping size selector of FIG. 3.

Referring to FIGS. 4A, 4B, 4C and 4D, examples of a distribution of the channel frequency response variance (or simply a distribution of variance) depending on the SNR and the WLAN channel models based on the IEEE 802.11 standard are illustrated.

An additive white Gaussian noise (AWGN) channel may have a relatively flat frequency response. The delay spread and the variation of the frequency response may increase in an order of a first channel ChA, a second channel ChB, a third channel ChC, a fourth channel ChD, a fifth channel ChE and a sixth channel ChF.

Figure 4A:
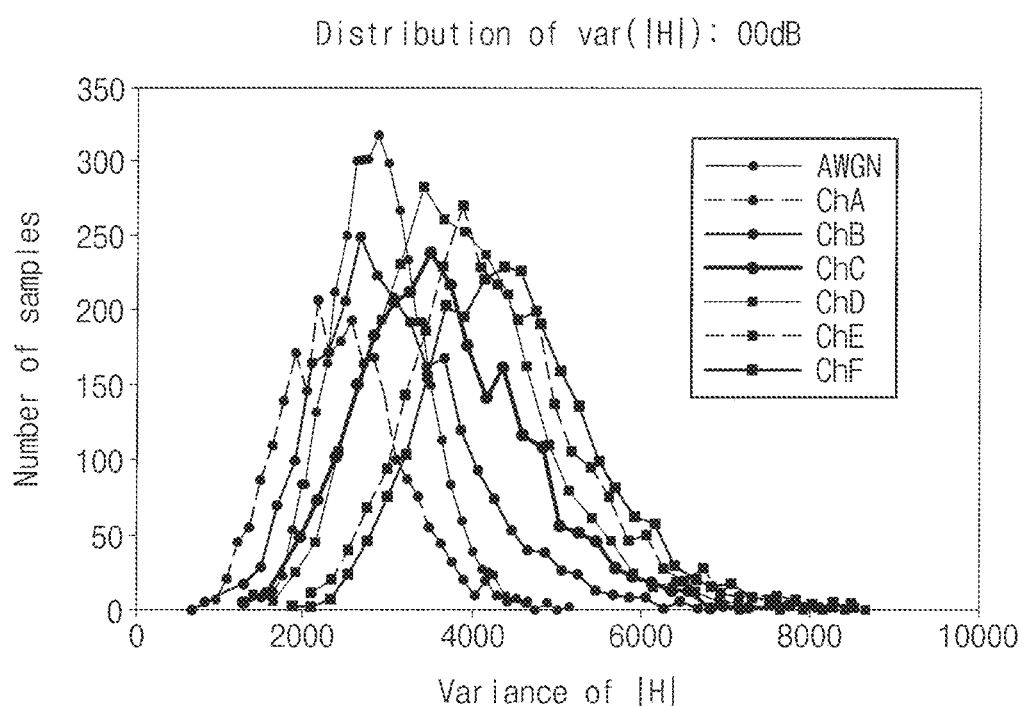
FIGS. 4A, 4B, 4C and 4D are diagrams for describing an operation of a grouping size selector of FIG. 3.
Figure 4B:
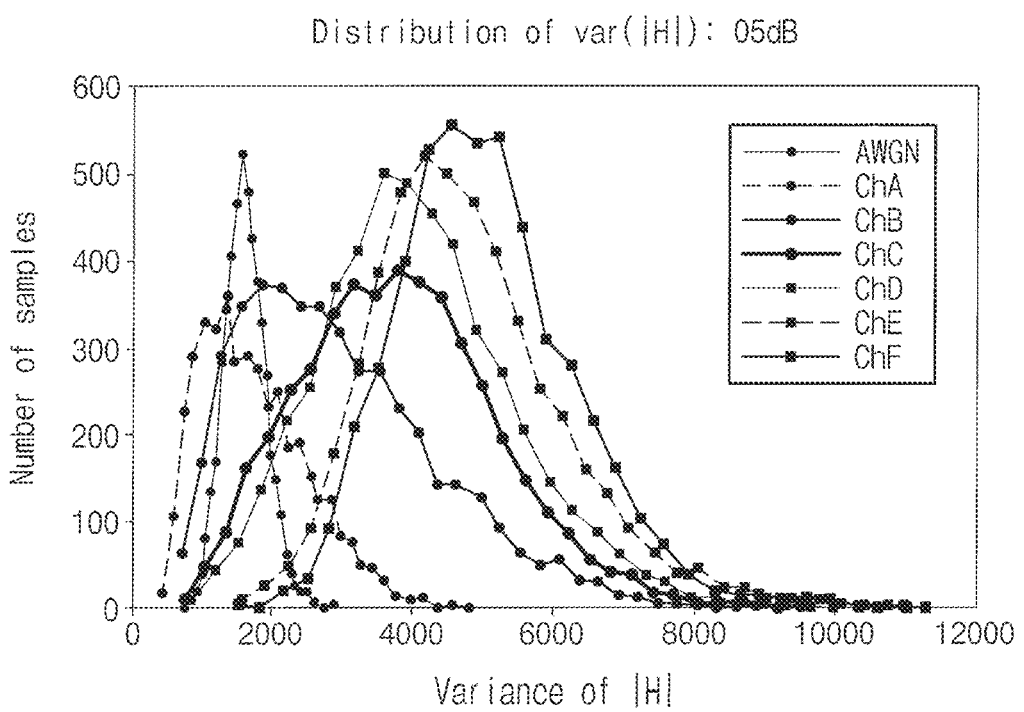
Figure 4C:
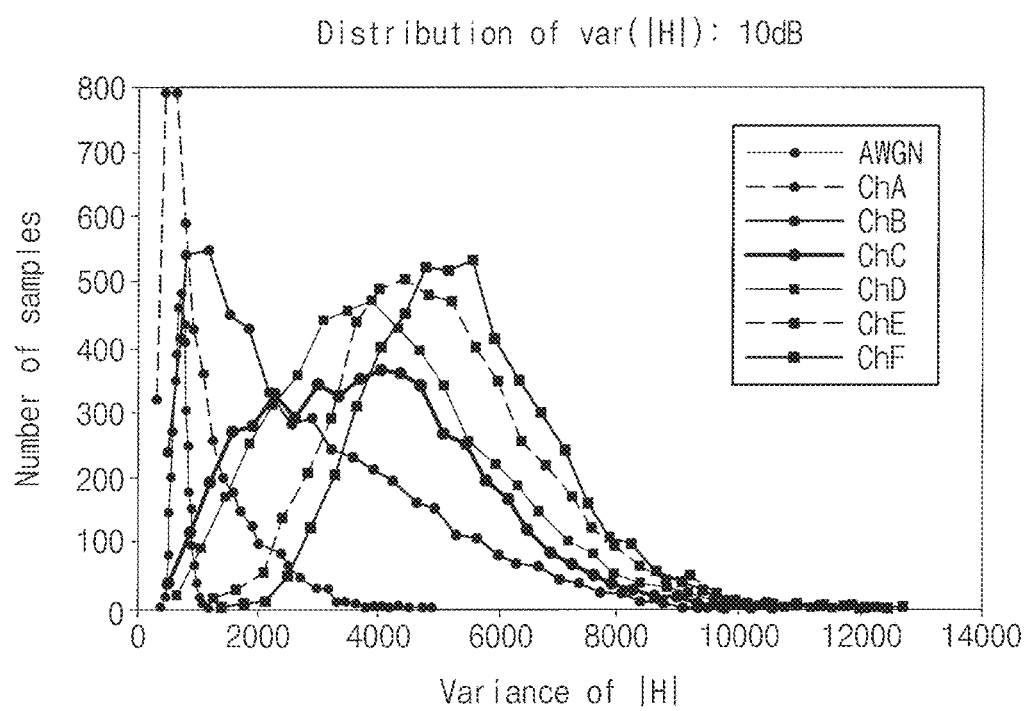
Figure 4D:
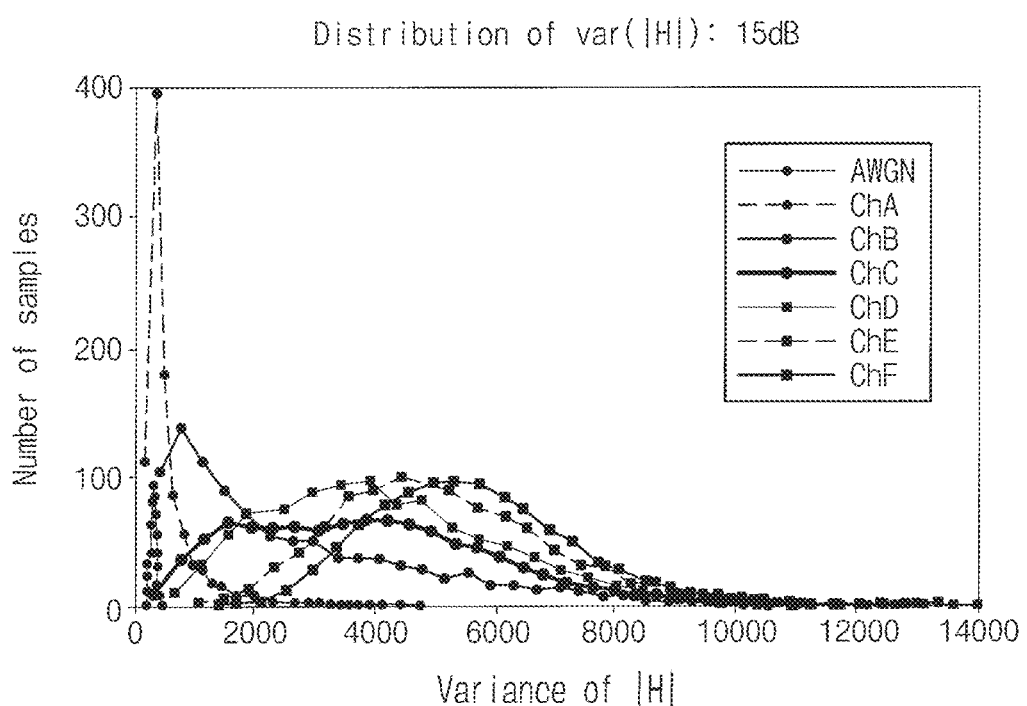

In an example of SNR=0 dB illustrated in FIG. 4A, there may be no clear difference in the distribution of variance for each channel type. In contrast, as illustrated in FIGS. 4B, 4C and 4D, as the SNR increases, there may be significant differences in the distribution of variance for each channel type. For example, in an example of SNR=15 dB illustrated in FIG. 4D, it may be seen that the distribution is concentrated in a relatively narrow area and the variance is relatively small in the AWGN channel and the first channel ChA, and it may be seen that the distribution is spread over a wide area and the variance is relatively large in the fourth channel ChD, the fifth channel ChE and the sixth channel ChF. If an appropriate threshold value is set using such characteristics, flat/selective channel frequency responses may be efficiently distinguished.

FIGS. 5A, 5B, 6A and 6B are diagrams for describing an operation of a selector included in a grouping size selector of FIG. 3.

Referring to FIGS. 5A and 5B, examples of the look-up table 226 included in the selector 224 are illustrated.

In examples of FIGS. 5A and 5B, the look-up table 226 may include one threshold value for each SNR. The selector 224 may select a first threshold value based on the estimated SNR provided from the SNR estimator 240. The selector 224 may select a first value as the grouping size value $N_g$ when (or based on determining that) the variation on the frequency of the channel is greater than the first threshold value. The selector 224 may select a second value greater than the first value as the grouping size value $N_g$ when (or based on determining that) the variation on the frequency of the channel is less than or equal to the first threshold value.

FIG. 5A illustrates an example where the grouping size value $N_g$ is selected using the variance of the frequency of the channel obtained based on Equation 7. For example, the look-up table 226 in FIG. 5A may include a plurality of SNRs SNR_1, SNR_2, ..., SNR_K and a plurality of threshold values TH_1$v$, TH_2$v$, ..., TH_K$v$ corresponding thereto, where K is a natural number greater than or equal to two. When the estimated SNR is greater than SNR_m and less than or equal to SNR_(m+1) among the plurality of SNRs SNR_1, SNR_2, ..., SNR_K, where m is a natural number greater than or equal to one and less than or equal to (K−1), a threshold value TH_m$v$ corresponding to SNR_m may be selected from among the plurality of threshold values TH_1$v$, TH_2$v$, ..., TH_K$v$. For example, when m=1, the threshold value TH_1$v$ may be selected. When the variance is greater than the selected threshold value TH_m$v$, the first value may be selected as the grouping size value $N_g$. When the variance is less than or equal to the selected threshold value TH_m$v$, the second value may be selected as the grouping size value $N_g$.

FIG. 5B illustrates an example where the grouping size value $N_g$ is selected using the delay spread of the channel obtained based on Equation 8. For example, the look-up table 226 in FIG. 5B may include a plurality of SNRs SNR_1, SNR_2, ..., SNR_K and a plurality of threshold values TH_1$d$, TH_2$d$, ..., TH_K$d$ corresponding thereto. When the estimated SNR is greater than SNR_m and less than or equal to SNR (m+1) among the plurality of SNRs SNR_1, SNR_2, ..., SNR_K, a threshold value TH and corresponding to SNR_m may be selected from among the plurality of threshold values TH_1$d$, TH_2$d$, ..., TH_K$d$. For example, when m=2, the threshold value TH_2$d$ may be selected. When the delay spread is greater than the selected threshold value TH_m$d$, the first value may be selected as the grouping size value $N_g$. When the delay spread is less than or equal to the selected threshold value TH_m$d$, the second value may be selected as the grouping size value $N_g$.

In example embodiments, the plurality of threshold values TH_1$v$, TH_2$v$, ..., TH_K$v$ in FIG. 5A may be different from the plurality of threshold values TH_1$d$, TH_2$d$, ..., TH_K$d$ in FIG. 5B.

In example embodiments, two examples where the grouping size value $N_g$ is four and sixteen may be defined in the IEEE 802.11ax standard, and thus the example of FIGS. 5A and 5B may be applied or employed to the IEEE 802.11ax standard. For example, the first value may be four, and the second value may be sixteen.

Referring to FIGS. 6A and 6B, other examples of the look-up table 226 included in the selector 224 are illustrated.

In examples of FIGS. 6A and 6B, the look-up table 226 may include two threshold values for each SNR. The selector 224 may select a first threshold value and a second threshold value greater than the first threshold value based on the estimated SNR provided from the SNR estimator 240. The selector 224 may select a first value as the grouping size value $N_g$ when (or based on determining that) the variation on the frequency of the channel is greater than the second threshold value. The selector 224 may select a second value greater than the first value as the grouping size value $N_g$ when (or based on determining that) the variation on the frequency of the channel is greater than the first threshold value and is less than or equal to the second threshold value. The selector 224 may select a third value greater than the second value as the grouping size value $N_g$ when (or based on determining that) the variation on the frequency of the channel is less than or equal to the first threshold value.

FIG. 6A illustrates an example where the grouping size value $N_g$ is selected using the variance of the frequency of the channel obtained based on Equation 7. For example, the look-up table 226 in FIG. 6A may include a plurality of SNRs SNR_1, SNR_2, . . . , SNR_K and a plurality of threshold values TH1_1v, TH1_2v, . . . , TH1_Kv, and TH2_1v, TH2_2v, . . . , TH2_Kv corresponding thereto. When the estimated SNR is greater than SNR_m and less than or equal to SNR_(m+1) among the plurality of SNRs SNR_1, SNR_2, . . . , SNR_K, a first threshold value TH1_mv and a second threshold value TH2_mv corresponding to SNR_m may be selected from among the plurality of threshold values TH1_1v, TH1_2v, . . . , TH1_Kv, and TH2_1v, TH2_2v, . . . , TH2_Kv. For example, when m=1, the first threshold value TH1_1v and the second threshold value TH2_1v may be selected. When the variance is greater than the selected second threshold value TH2_mv, the first value may be selected as the grouping size value $N_g$. When the variance is greater than the selected first threshold value TH1_mv and is less than or equal to the selected second threshold value TH2_mv, the second value may be selected as the grouping size value $N_g$. When the variance is less than or equal to the selected first threshold value TH1_mv, the third value may be selected as the grouping size value $N_g$.

FIG. 6B illustrates an example where the grouping size value $N_g$ is selected using the delay spread of the channel obtained based on Equation 8. For example, the look-up table 226 in FIG. 6B may include a plurality of SNRs SNR_1, SNR_2, . . . , SNR_K and a plurality of threshold values TH1_1d, TH1_2d, . . . , TH1_Kd, and TH2_1d, TH2_2d, . . . , TH2_Kd corresponding thereto. When the estimated SNR is greater than SNR_m and less than or equal to SNR_(m+1) among the plurality of SNRs SNR_1, SNR_2, . . . , SNR_K, a first threshold value TH1_md and a second threshold value TH2_md corresponding to SNR_m may be selected from among the plurality of threshold values TH1_1d, TH1_2d, . . . , TH1_Kd, and TH2_1d, TH2_2d, . . . , TH2_Kd. For example, when m=2, the first threshold value TH1_2d and the second threshold value TH2_2d may be selected. When the delay spread is greater than the selected second threshold value TH2_md, the first value may be selected as the grouping size value $N_g$. When the delay spread is greater than the selected first threshold value TH1_md and is less than or equal to the selected second threshold value TH2_md, the second value may be selected as the grouping size value $N_g$. When the delay spread is less than or equal to the selected first threshold value TH1_md, the third value may be selected as the grouping size value $N_g$.

In example embodiments, the plurality of threshold values TH1_1v, TH1_2v, . . . , TH1_Kv, and TH2_1v, TH2_2v, . . . , TH2_Kv in FIG. 6A may be different from the plurality of threshold values TH1_1d, TH1_2d, . . . , TH1_Kd, and TH2_1d, TH2_2d, . . . , TH2_Kd in FIG. 6B.

In example embodiments, three examples where the grouping size value $N_g$ is one, two and four may be defined in the IEEE 802.11ac standard, and thus the example of FIGS. 6A and 6B may be applied or employed to the IEEE 802.11ac standard. For example, the first value may be one, the second value may be two, and the third value may be four.

In example embodiments, the plurality of SNRs SNR_1, SNR_2, . . . , SNR_K and the plurality of threshold values TH_1v, TH_2v, . . . , TH_Kv, TH_1d, TH_2d, . . . , TH_Kd, TH1_1v, TH1_2v, . . . , TH1_Kv, TH2_1v, TH2_2v, . . . , TH2_Kv, TH1_1d, TH1_2d, . . . , TH1_Kd, and TH2_1d, TH2_2d, . . . , TH2_Kd in FIGS. 5A, 5B, 6A and 6B may be preset, predetermined (or may be set or determined in advance) or alternatively, given as optimized or effective values by a register offline.

Although FIGS. 5A, 5B, 6A and 6B illustrate examples where the look-up table 226 includes one or two threshold values for each SNR, example embodiments are not limited thereto. For example, the look-up table 226 may include three or more threshold values for each SNR. Alternatively, at least one threshold may be selected based on a factor, parameter or criteria other than the SNR.

Figure 7:
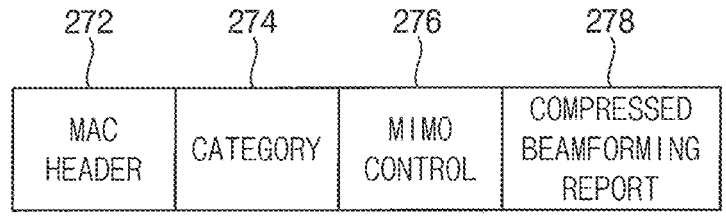
FIG. 7 is a diagram illustrating an example of a beamforming feedback report generated by a beamformee device according to example embodiments.

FIG. 7 is a diagram illustrating an example of a beamforming feedback report generated by a beamformee device according to example embodiments.

Referring to FIG. 7, a beamforming feedback report BFR may include media access control (MAC) header information 272, category information 274, multiple-input multiple-output (MIMO) control information 276, and compressed beamforming report (CBR) information 278.

The CBR information 278 may include information in which the channel information are compressed. For example, the CBR information 278 may be obtained by compressing the channel information associated with each subcarrier, and the channel information may include the angle values $\varphi$ and $\psi$ obtained based on Equation 4. In addition, the CBR information 278 may be obtained by compressing the selected channel information based on the grouping size value $N_g$ determined by the grouping size selector 220 according to example embodiments.

In example embodiments, at least a part of the components (e.g., the channel estimator 210, the grouping size selector 220, the measurer 222, the selector 224, the feedback unit 230, the SVD unit 232, the compression unit 234 and the SNR estimator 240) included in the beamformee device 200 may be implemented as hardware. For example, at least a part of the components included in the beamformee device 200 may be included in a computer-based electronic system. In example embodiments, at least a part of the components included in the beamformee device 200 may be implemented as instruction codes or program routines (e.g., a software program) in combination with hardware. For example, the instruction codes or the program routines may be executed by a computer-based electronic system, and may be stored in any storage device located inside or outside the computer-based electronic system.

In the wireless communication system 10 and the beamformee device 200 according to example embodiments, the subcarrier grouping may be applied or employed while the beamforming feedback is performed in the feedback mode. In particular, the subcarrier grouping in real-time may be applied or employed to adaptively set, determine and change the grouping size value $N_g$ in consideration of the channel characteristics in real-time. Accordingly, the feedback overhead of the beamforming feedback may be efficiently reduced, and the beamforming feedback may be efficiently performed.

Figure 8:
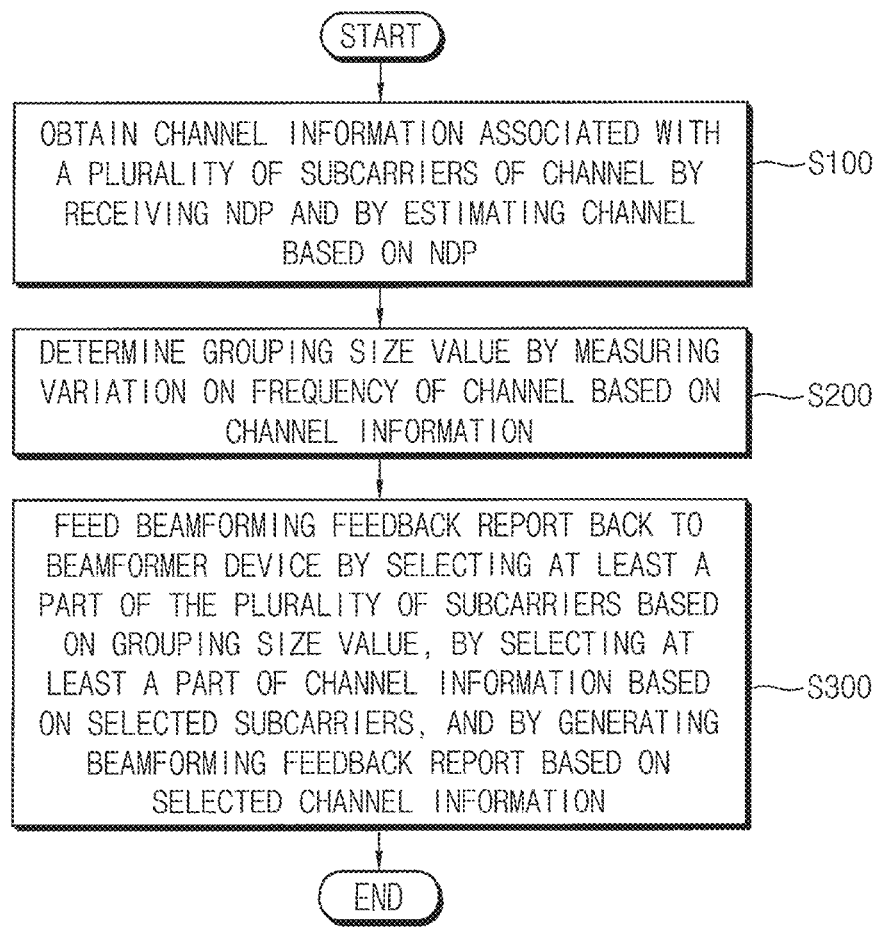
FIG. 8 is a flowchart illustrating a beamforming feedback method according to example embodiments.

FIG. 8 is a flowchart illustrating a beamforming feedback method according to example embodiments.

Referring to FIG. 8, a beamforming feedback method according to example embodiments is performed by a wireless communication system that includes a beamformer device and a beamformee device. For example, the beamforming feedback method according to example embodiments may be performed by the beamformee device. The wireless communication system and the beamformee device may be implemented as described with reference to FIGS. 1, 2, 3, 4A, 4B, 4C, 4D, 5A, 5B, 6A, 6B and 7.

In the beamforming feedback method according to example embodiments, channel information associated with a plurality of subcarriers of a channel may be obtained by receiving an NDP from the beamformer device through the channel and by estimating the channel based on the NDP (operation S100). For example, operation S100 may be performed by the channel estimator 210 in FIG. 1.

A grouping size value used to select at least a part of the plurality of subcarriers is determined by measuring a variation on a frequency of the channel based on the channel information (operation S200). For example, operation S200 may be performed by the grouping size selector 220 in FIG. 1, and may be performed as described with reference to FIGS. 2, 3, 4A, 4B, 4C, 4D, 5A, 5B, 6A and 6B. For example, the subcarrier grouping in real-time may be performed by operation S200 such that the grouping size value is adaptively changed depending on the channel condition.

In example embodiments, in operation S200, the variation on the frequency of the channel may be measured in real-time based on the plurality of channel information, and the grouping size value may be selected and changed in real-time based on at least one threshold value and the measured variation in real-time.

In example embodiments, in operation S200, the variation on the frequency of the channel may be obtained by calculating a variance of the frequency of the channel. For example, the variance of the frequency of the channel may be obtained based on Equation 7 described with reference to FIG. 3.

In example embodiments, in operation S200, the variation on the frequency of the channel may be obtained by calculating a delay spread of the channel. For example, the delay spread of the channel may be obtained based on Equation 8 described with reference to FIG. 3.

In example embodiments, in operation S200, an SNR of the channel may be estimated, the at least one threshold value may be selected based on the estimated SNR, and the grouping size value may be selected based on the selected threshold value and the measured variation (e.g., by comparing the measured variation with the selected threshold value). For example, as described with reference to FIGS. 5A and 5B, the look-up table including one threshold value for each SNR may be used, a first threshold value may be selected based on the estimated SNR, and one of first and/or second values may be selected as the grouping size value based on the first threshold value. For another example, as described with reference to FIGS. 6A and 6B, the look-up table including two threshold values for each SNR may be used, first and second threshold values may be selected based on the estimated SNR, and one of the first, second and/or third values may be selected as the grouping size value based on the first and second threshold values.

A beamforming feedback report may be fed back to the beamformer device by selecting at least the part of the plurality of subcarriers based on the grouping size value, by selecting at least a part of the channel information based on the selected subcarriers, and by generating the beamforming feedback report based on the selected channel information (operation S300). For example, operation S300 may be performed by the feedback unit 230 in FIG. 1.

In the beamforming feedback method according to example embodiments, the subcarrier grouping in real-time may be applied or employed. Accordingly, the feedback overhead of the beamforming feedback may be efficiently reduced, and the beamforming feedback may be efficiently performed.

Figure 9:
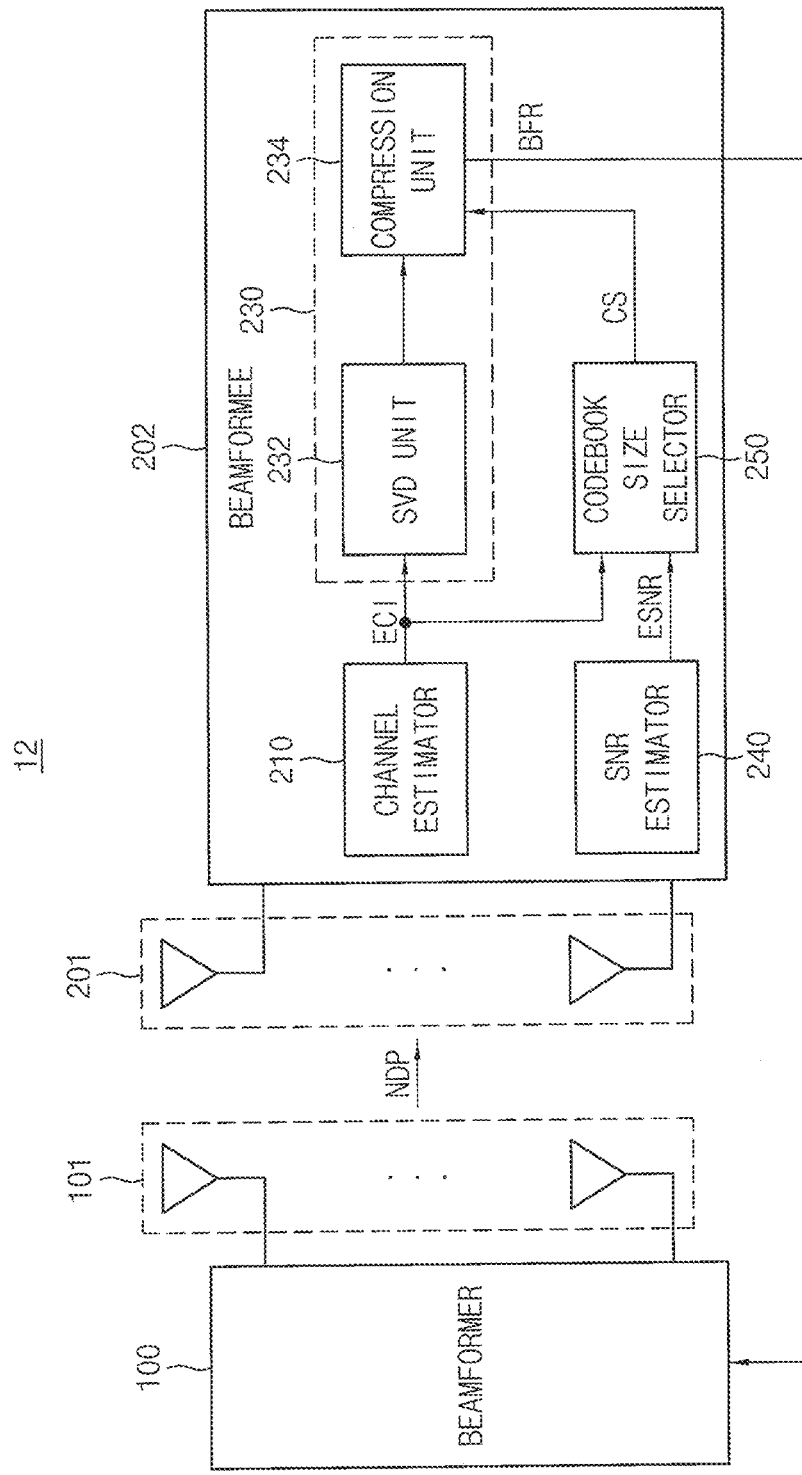
FIG. 9 is a block diagram illustrating a beamformee device and a wireless communication system including the beamformee device according to example embodiments.

FIG. 9 is a block diagram illustrating a beamformee device and a wireless communication system including the beamformee device according to example embodiments. The descriptions repeated with FIG. 1 will be omitted.

Referring to FIG. 9, a wireless communication system 12 includes the beamformer device 100 and a beamformee device 202. The beamformer device 100 may include a plurality of antennas 101. The beamformee device 202 may include the channel estimator 210, a codebook size selector 250 and/or the feedback unit 230. The beamformee device 202 may further include the plurality of antennas 201 and/or the SNR estimator 240.

The wireless communication system 12 and the beamformee device 202 may be the same, or substantially the same, as the wireless communication system 10 and the beamformee device 200 of FIG. 1, respectively, except that the beamformee device 202 includes the codebook size selector 250 instead of the grouping size selector 220 and an operation of the feedback unit 230 is partially changed.

The beamformee device 202 may perform a codebook size selection in real-time and/or online (or during runtime) to reduce the feedback overhead of the beamforming feedback. The beamformee device 202 may quantize channel information associated with subcarriers based on the selected codebook size, and feeds back the quantized channel information.

The codebook size selector 250 may measure a variation on a frequency of the channel based on the channel information ECI, and determine a codebook size value used to quantize at least a part of the channel information ECI based on the measured variation. The codebook size selector 250 may generate a codebook size signal CS representing the codebook size value. For example, the variation on the frequency of the channel may represent a change in characteristics occurring on the channel. For example, as will be described with reference to FIG. 12, the variation on the frequency of the channel may be measured or obtained by calculating a variance of the frequency of the channel and/or by calculating a delay spread of the channel.

In example embodiments, the codebook size selector 250 may measure the variation on the frequency of the channel in real-time based on the channel information ECI, and may select and change the codebook size value in real-time based on the measured variation in real-time. The operation of selecting and changing the codebook size value in real-time may represent that the codebook size value is changeable or variable, whenever the beamforming feedback is performed, and in every frame of the beamforming feedback report BFR that is fed back by the beamformee device 202. In other words, the codebook size selection in real-time according to example embodiments may be performed by the codebook size selector 250, and thus the feedback overhead of the beamforming feedback may be reduced. The codebook size selection will be described with reference to FIGS. 10 and 11. A detailed configuration of the codebook size selector 250 and a detailed operation of performing the codebook size selection in real-time will be described with reference to FIG. 12.

The feedback unit 230 may generate a beamforming feedback report BFR based on the codebook size value (e.g., the codebook size signal CS) and the plurality of channel information ECI, and feed the beamforming feedback report BFR back to the beamformer device 100. For example, the feedback unit 230 may generate the beamforming feedback report BFR by quantizing at least a part of the channel information ECI, and a bit size (or the number of bits) associated with the quantization may be set based on the codebook size value.

The feedback unit 230 may include the SVD unit 232 and/or the compression unit 234. The SVD unit 232 may perform an SVD on the channel information ECI. The compression unit 234 may generate the beamforming feedback report BFR based on the codebook size value (e.g., the codebook size signal CS) and the channel information ECI (e.g., an output of the SVD unit 232).

In addition, the estimated SNR (e.g., the SNR signal ESNR) provided from the SNR estimator 240 may be used by the codebook size selector 250 to determine the codebook size value.

During the beamforming transmission in the WLAN system, the angle values φ and ψ for each subcarrier obtained based on Equation 1 through Equation 6 may be quantized by the compression unit 234 based on bit sizes $b_\varphi$ and $b_\psi$, respectively. The quantized angle values may be included in a CBR information (e.g., the CBR information 278 in FIG. 7) of the beamforming feedback report BFR based on Equation 9 and Equation 10, and may be fed back to the beamformer device 100.

$$\hat{\phi}_{ji}^{(k)} = \frac{n\pi}{2^{b_\phi-1}} + \frac{\pi}{2^{b_\phi}}, n = 1, 2, ..., 2^{b_\phi-1} \quad \text{[Equation 9]}$$

$$\hat{\psi}_{ji}^{(k)} = \frac{n\pi}{2^{b_\psi-1}} + \frac{\pi}{2^{b_\psi}}, n = 1, 2, ..., 2^{b_\psi-1} \quad \text{[Equation 10]}$$

The bit sizes $b_\varphi$ and $b_\psi$ may be defined as or may correspond to the codebook size value.

Figure 11:
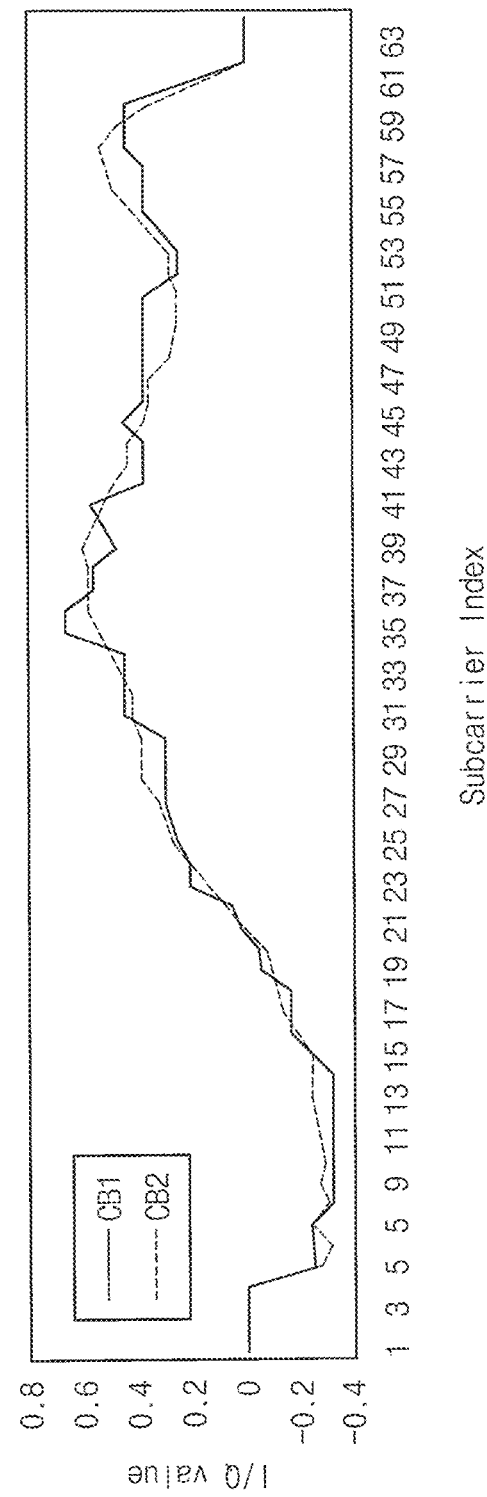

FIGS. 10 and 11 are diagrams for describing a codebook size selection according to example embodiments.

Referring to FIG. 10, examples of codebooks having various sizes are illustrated. The codebook size selection may be used in the IEEE 802.11ac standard and/or the IEEE 802.11ax standard that are WLAN standards, and will be used in the IEEE 802.11be standard that is a next generation standard.

In FIG. 10, SU represents the single-user beamforming, MU represents the multi-user beamforming, and each of CASE1 and CASE2 represents an example of codebook configurations. For example, in the single-user beamforming SU, one of two codebooks CB1_SU and CB2_SU having different sizes may be selected. In the multi-user beamforming MU, one of two codebooks CB1_MU and/or CB2_MU having different sizes may be selected as in CASE1, or one of three codebooks CB1_MU, CB2_MU and/or CB3_MU having different sizes may be selected as in CASE2. The codebook size value $\{b_\varphi, b_\psi\}$ may be determined based on the selected codebook.

In example embodiments, when the codebook and/or the codebook size value $\{b_\varphi, b_\psi\}$ is determined, the channel information for each subcarrier may be quantized based on the determined codebook size value $\{b_\varphi, b_\psi\}$, and the quantized channel information may be fed back. For example, when the codebook CB1_SU is selected, the codebook size value $\{b_\varphi, b_\psi\}$ may be determined to {2, 4}, and the bit sizes $b_\varphi$ and $b_\psi$ may be determined to two and four, respectively, which means that the angle values φ and ψ are quantized to two bits and four bits, respectively. The angle values φ and ψ for each subcarrier may be quantized based on the determined codebook size value $\{b_\varphi, b_\psi\}$ (e.g., the angle value φ may be quantized to two bits and the angle value ψ may be quantized to four bits), and the quantized angle values may be fed back to the beamformer device 100.

In example embodiments, the codebook size value $\{b_\varphi, b_\psi\}$ may be determined by the beamformer device 100 or the beamformee device 202. For example, in the single-user beamforming SU, the beamformee device 202 may set the codebook size value $\{b_\varphi, b_\psi\}$ independently and/or by itself. For example, in the multi-user beamforming MU, the beamformer device 100 may set the codebook size value $\{b_\varphi, b_\psi\}$ and may request it to the beamformee device 202 using a codebook field value in the NDPA frame, and the beamformee device 202 may feed back channel information by quantizing the channel information based on the codebook size value $\{b_\varphi, b_\psi\}$ requested by the beamformer device 100.

The wireless communication system 12 and the beamformee device 202 according to example embodiments may operate based on the single-user beamforming SU. For example, the beamformee device 202 may receive the NDPA frame and the NDP, and then may set the codebook size value $\{b_\varphi, b_\psi\}$ in real-time based on the channel characteristics obtained by estimating the channel. However, example embodiments are not limited thereto. Alternatively, the wireless communication system 12 and the beamformee device 202 according to example embodiments may operate based on the multi-user beamforming MU, and the beamformer device 100 may set the codebook size value $\{b_\varphi, b_\psi\}$ in a similar manner based on the result of estimating the channel.

In example embodiments, CASE1 in FIG. 10 may correspond to the IEEE 802.11ac standard and the IEEE 802.11ax standard, and CASE2 in FIG. 10 may correspond to the IEEE 802.11be standard. In the IEEE 802.11ac and 802.11ax standards, two codebooks, which include a coarse codebook having a relatively small quantization bit size and a fine codebook having a quantization bit size larger than that of the coarse codebook, may be used. For example, the codebooks CB1_SU and CB1_MU may correspond to the coarse codebook, and the codebooks CB2_SU and CB2_MU may correspond to the fine codebook. In the IEEE 802.11be standard, the use of three codebooks, which include a coarse codebook having the smallest quantization bit size, a fine codebook having a quantization bit size than larger than that of the coarse codebook and a very fine codebook having the largest quantization bit size, may be considered. For example, the codebooks CB1_SU and CB1_MU may correspond to the coarse codebook, the codebooks CB2_SU and CB2_MU may correspond to the fine codebook, and the codebook CB3_MU may correspond to the very fine codebook. For example, the very fine codebook may be used only in MU-MIMO.

Referring to FIG. 11, a difference in the beamforming depending on the codebook size value is illustrated. FIG. 11 depicts subcarrier index values in relation to in-phase/quadrature (I/Q) values. In FIG. 11, CB1 represents a codebook having a relatively small quantization bit size, and CB2 represents a codebook having a relatively large quantization bit size. For example, CB1 may correspond to the coarse codebook, and CB2 may correspond to the fine codebook.

For example, the quantized angle values obtained based on Equation 9 and Equation 10 may be included in the CBR information (e.g., the CBR information 278 in FIG. 7) of the beamforming feedback report BFR, and may be fed back (e.g., transmitted) to the beamformer device 100. The beamformer device 100 may generate a beam $Q_k$ based on Equation 4 in the single-user beamforming. According to example embodiments, the beamformer device 100 may generate an updated beam based on the quantized angle values included in the beamforming feedback report BFR. The updated beam may include communication information. According to example embodiments, the beamformee device 200 may receive the updated beam and thereby obtain the communication information.

As illustrated in FIG. 11, when the codebook CB1 having a relatively small quantization bit size is used, the feedback overhead may be reduced, but the resolution may be degraded. When the codebook CB2 having a relatively large quantization bit size is used, the resolution may be improved, but the feedback overhead may increase. In contrast, when the codebook size value is appropriately selected based on the channel condition (e.g., based on a change in the channel depending on the frequency) according to example embodiments, the feedback overhead may be reduced, and the performance degradation may be prevented or reduced.

Figure 12:
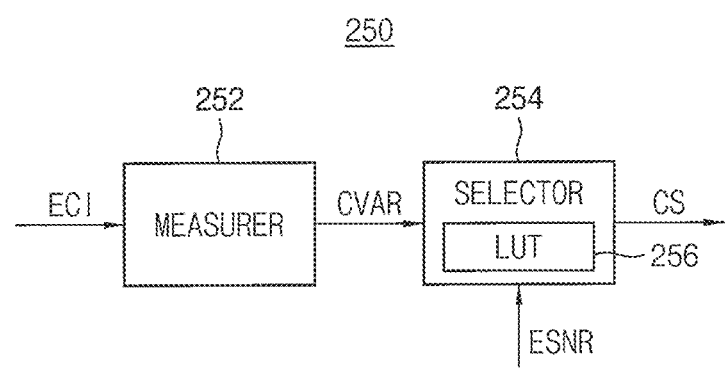
FIG. 12 is a block diagram illustrating an example of a codebook size selector included in a beamformee device of FIG. 9.

FIG. 12 is a block diagram illustrating an example of a codebook size selector included in a beamformee device of FIG. 9. The descriptions repeated with FIG. 3 will be omitted.

Referring to FIG. 12, a codebook size selector 250 may include a measurer 252 and/or a selector 254. The measurer 252 and the selector 254 may have configurations and operations similar to those of the measurer 222 and the selector 224 in FIG. 3, respectively.

The measurer 252 may measure the variation on the frequency of the channel in real-time based on the channel information ECI, and may generate a variation signal CVAR representing the variation on the frequency of the channel.

In example embodiments, the measurer 252 may obtain the variation on the frequency of the channel by calculating a variance of the frequency of the channel. For example, the variance of the frequency of the channel may be obtained based on Equation 7.

In example embodiments, the measurer 252 may obtain the variation on the frequency of the channel by calculating a delay spread of the channel. For example, the delay spread of the channel may be obtained based on Equation 8.

The selector 254 may select and change the codebook size value $\{b_\varphi, b_\psi\}$ in real-time based on at least one threshold value and the measured variation in real-time, and may generate the codebook size signal CS representing the codebook size value $\{b_\varphi, b_\psi\}$.

In example embodiments, as the variation on the frequency of the channel increases, the selector 254 may select a larger value as the codebook size value $\{b_\varphi, b_\psi\}$ (e.g., may select the codebook size value $\{b_\varphi, b_\psi\}$ based on the fine codebook), and as the variation on the frequency of the channel decreases, the selector 254 may select a smaller value as the codebook size value $\{b_\varphi, b_\psi\}$ (e.g., may select the codebook size value $\{b_\varphi, b_\psi\}$ based on the coarse codebook).

In example embodiments, the selector 254 may receive the SNR signal ESNR from the SNR estimator 240. The selector 254 may select the at least one threshold value based on the estimated SNR, and may select the codebook size value $\{b_\varphi, b_\psi\}$ based on the selected threshold value and the measured variation in real-time.

In example embodiments, the selector 254 may include a look-up table 256 that is preset, set in advance or alternatively, given. For example, the look-up table 256 may represent a relationship between the estimated SNR and the at least one threshold value.

In example embodiments, the look-up table 256 may be implemented as illustrated in FIG. 5A. When the variance of the frequency of the channel obtained based on Equation 7 is greater than the selected threshold value TH_mv, a first value, which is a relatively large value, may be selected as the codebook size value $\{b_\varphi, b_\psi\}$ based on the fine codebook. When the variance is less than or equal to the selected threshold value TH_mv, a second value smaller than the first value may be selected as the codebook size value $\{b_\varphi, b_\psi\}$ based on the coarse codebook.

In example embodiments, the look-up table 256 may be implemented as illustrated in FIG. 5B. When the delay spread of the channel obtained based on Equation 8 is greater than the selected threshold value TH_md, the first value may be selected as the codebook size value $\{b_\varphi, b_\psi\}$ based on the fine codebook. When the delay spread is less than or equal to the selected threshold value TH_md, the second value may be selected as the codebook size value $\{b_\varphi, b_\psi\}$ based on the coarse codebook.

In example embodiments, two codebooks including the coarse codebook and the fine codebook may be used in the IEEE 802.11ac and 802.11ax standards, and thus the examples of FIGS. 5A and 5B may be applied or employed to the IEEE 802.11ac and 802.11ax standards illustrated as CASE1 in FIG. 10.

In example embodiments, the look-up table 256 may be implemented as illustrated in FIG. 6A. When the variance of the frequency of the channel obtained based on Equation 7 is greater than the selected second threshold value TH2_mv, a first value, which is the largest value, may be selected as the codebook size value $\{b_\varphi, b_\psi\}$ based on the very fine codebook. When the variance is greater than the selected first threshold value TH1_mv and less than or equal to the selected second threshold value TH2_mv, a second value smaller than the first value may be selected as the codebook size value $\{b_\varphi, b_\psi\}$ based on the fine codebook. When the variance is less than or equal to the selected first threshold value TH1_mv, a third value smaller than the second value may be selected as the codebook size value $\{b_\varphi, b_\psi\}$ based on the coarse codebook.

In example embodiments, the look-up table 256 may be implemented as illustrated in FIG. 6B. When the delay spread of the channel obtained based on Equation 8 is greater than the selected second threshold value TH2_md, the first value may be selected as the codebook size value $\{b_\varphi, b_\psi\}$ based on the very fine codebook. When the delay spread is greater than the selected first threshold value TH1_md and less than or equal to the selected second threshold value TH2_md, the second value may be selected as the codebook size value $\{b_\varphi, b_\psi\}$ based on the fine codebook. When the delay spread is less than or equal to the selected first threshold value TH1_md, the third value may be selected as the codebook size value $\{b_\varphi, b_\psi\}$ based on the coarse codebook.

In example embodiments, three codebooks including the coarse codebook, the fine codebook and the very fine codebook may be used in the IEEE 802.11be standard, and thus the examples of FIGS. 6A and 6B may be applied or employed to the IEEE 802.11be standard illustrated as CASE2 in FIG. 10.

In the wireless communication system 12 and the beamformee device 202 according to example embodiments, the beamformee device 202 may determine the codebook size value $\{b_\varphi, b_\psi\}$ in real-time or online using the channel information obtained from the received NDP. In other words, the beamformee device 202 may variably and adaptively change the codebook size value $\{b_\varphi, b_\psi\}$ depending on the channel condition. For example, a relatively large codebook size value $\{b_\varphi, b_\psi\}$ may be used when the variation on the frequency of the channel estimated from the NDP is relatively large, and a relatively small codebook size value $\{b_\varphi, b_\psi\}$ may be used when the variation on the frequency of the channel is relatively small. In addition, the variation may be measured by using the calculation based on the channel frequency response variance or the calculation based on the channel delay spread. In example embodiments, the above-described two calculations may be simultaneously, concurrently or contemporaneously used.

Figure 13:
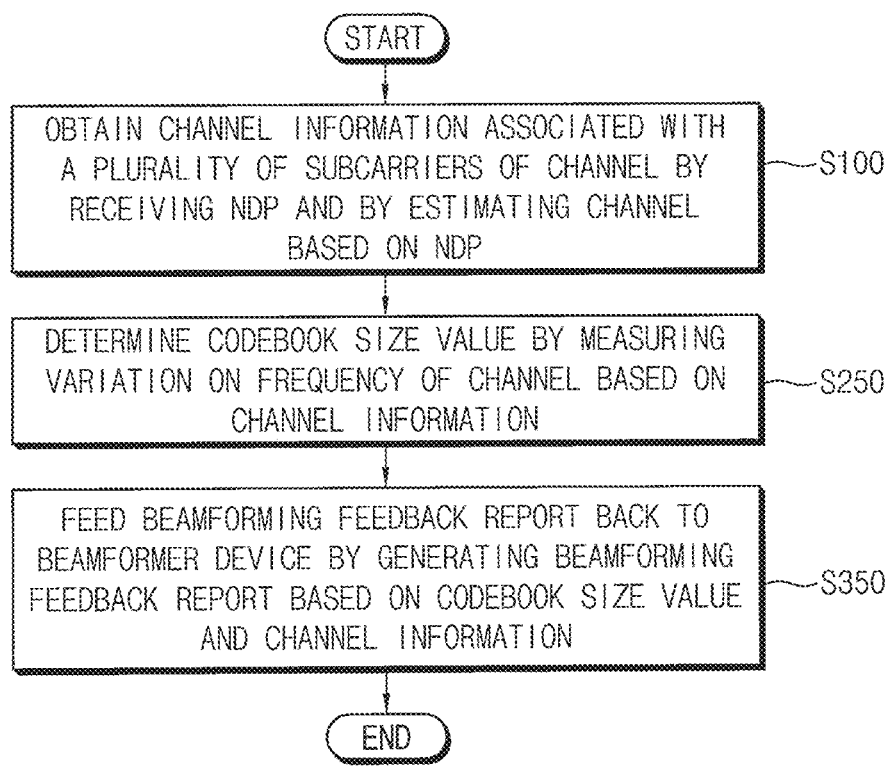
FIG. 13 is a flowchart illustrating a beamforming feedback method according to example embodiments.

FIG. 13 is a flowchart illustrating a beamforming feedback method according to example embodiments. The descriptions repeated with FIG. 8 will be omitted.

Referring to FIG. 13, in a beamforming feedback method according to example embodiments, operation S100 may be the same as, or substantially the same as, operation S100 in FIG. 8.

A codebook size value used to quantize at least a part of the plurality of channel information is determined by measuring a variation on a frequency of the channel based on the plurality of channel information (operation S250). For example, operation S250 may be performed by the codebook size selector 250 in FIG. 9, and may be performed as described with reference to FIGS. 10, 11 and 12. For example, the codebook size selection in real-time may be performed by operation S250 such that the codebook size value is adaptively changed depending on the channel condition.

In example embodiments, in operation S250, the variation on the frequency of the channel may be measured in real-time based on the plurality of channel information, and the codebook size value may be selected and changed in real-time based on at least one threshold value and the measured variation in real-time.

In example embodiments, in operation S250, the variation on the frequency of the channel may be obtained by calculating a variance of the frequency of the channel. For example, the variance of the frequency of the channel may be obtained based on Equation 7.

In example embodiments, in operation S250, the variation on the frequency of the channel may be obtained by calculating a delay spread of the channel. For example, the delay spread of the channel may be obtained based on Equation 8.

In example embodiments, in operation S250, an SNR of the channel may be estimated, the at least one threshold value may be selected based on the estimated SNR, and the codebook size value may be selected based on the selected threshold value and the measured variation (e.g., by comparing the measured variation with the selected threshold value). For example, as described with reference to FIGS. 5A and 5B, the look-up table including one threshold value for each SNR may be used. For another example, as described with reference to FIGS. 6A and 6B, the look-up table including two threshold values for each SNR may be used.

A beamforming feedback report may be fed back to the beamformer device by generating the beamforming feedback report based on the codebook size value and the plurality of channel information (operation S350). For example, operation S350 may be performed by the feedback unit 230 in FIG. 9.

In the beamforming feedback method according to example embodiments, the codebook size selection in real-time may be applied or employed. Accordingly, the feedback overhead of the beamforming feedback may be efficiently reduced, and the beamforming feedback may be efficiently performed.

Figure 14:
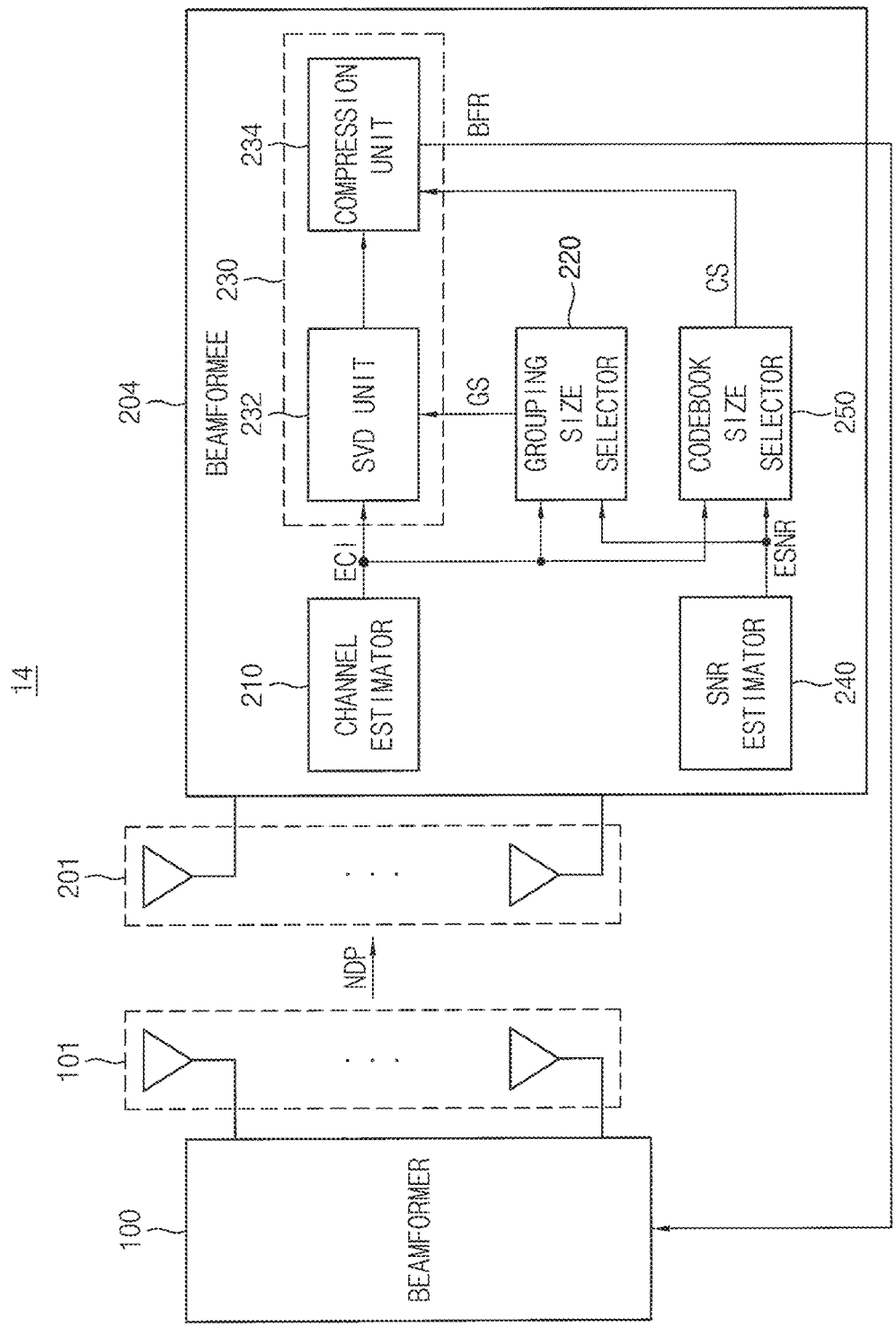
FIG. 14 is a block diagram illustrating a beamformee device and a wireless communication system including the beamformee device according to example embodiments.

FIG. 14 is a block diagram illustrating a beamformee device and a wireless communication system including the beamformee device according to example embodiments. The descriptions repeated with FIGS. 1 and 9 will be omitted.

Referring to FIG. 14, a wireless communication system 14 may include a beamformer device 100 and a beamformee device 204. The beamformer device 100 may include a plurality of antennas 101. The beamformee device 204 includes the channel estimator 210, the grouping size selector 220, the codebook size selector 250 and/or the feedback unit 230. The beamformee device 204 may further include the plurality of antennas 201 and/or the SNR estimator 240.

The wireless communication system 14 and the beamformee device 204 may be the same, or substantially the same, as the wireless communication system 10 and the beamformee device 200 of FIG. 1, respectively, except that the beamformee device 204 further includes the codebook size selector 250 and an operation of the feedback unit 230 is partially changed. The codebook size selector 250 may be the same, or substantially the same, as the codebook size selector 250 in FIG. 9.

The beamformee device 204 may perform both the subcarrier grouping in real-time described with reference to FIGS. 1 through 8 and the codebook size selection in real-time described with reference to FIGS. 9 through 13.

Figure 15:
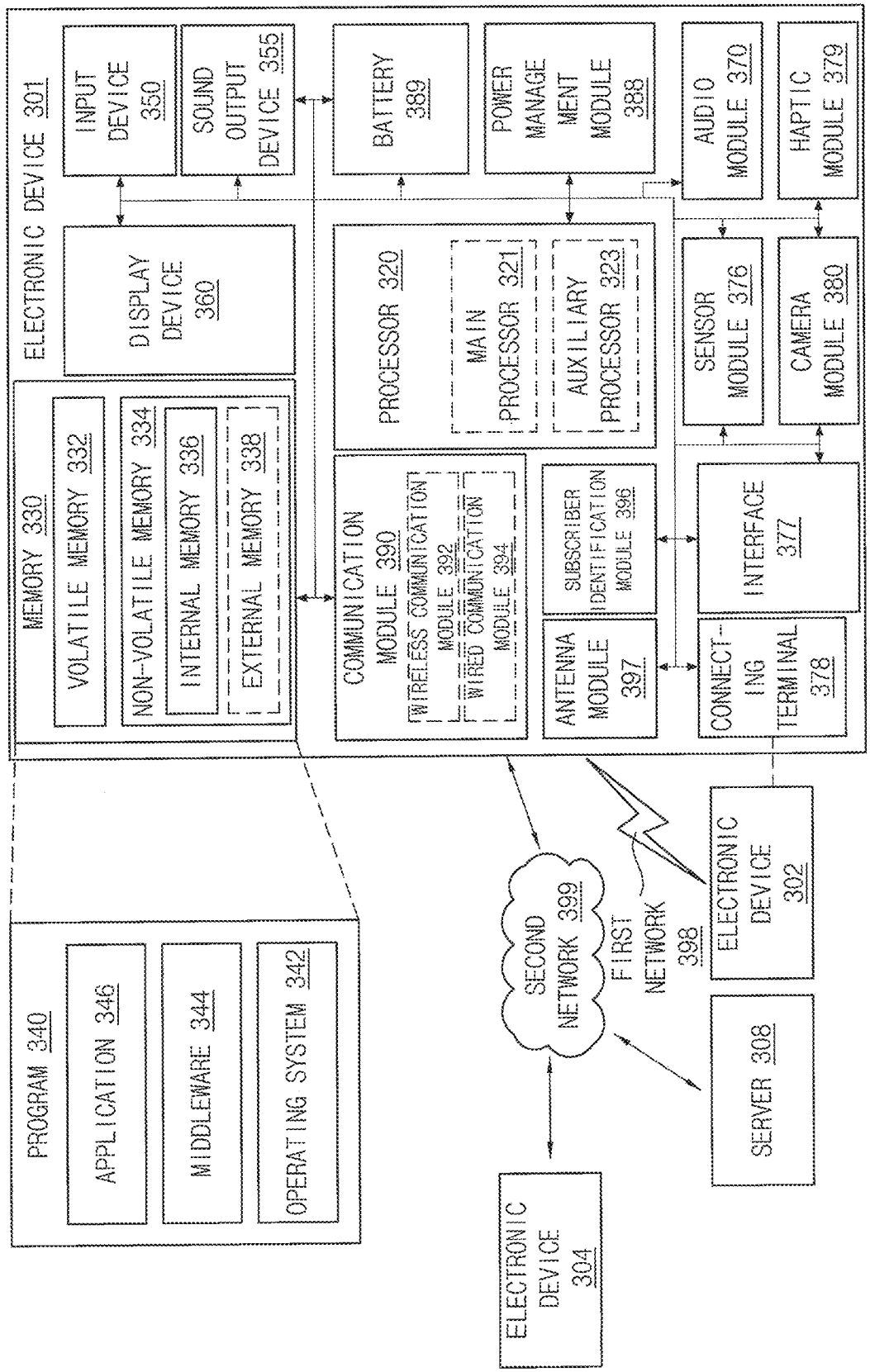
FIG. 15 is a block diagram illustrating an electronic device in a network environment according to example embodiments.

FIG. 15 is a block diagram illustrating an electronic device in a network environment according to example embodiments.

Referring to FIG. 15, an electronic device 301 in a network environment 300 may communicate with an electronic device 302 via a first network 398 (e.g., a short-range wireless communication network), or an electronic device 304 or a server 308 via a second network 399 (e.g., a long-range wireless communication network). For example, the electronic device 301 may communicate with the electronic device 304 via the server 308. For example, the electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, and/or an antenna module 397. In example embodiments, at least one (e.g., the display device 360 or the camera module 380) of the components may be omitted from the electronic device 301, or one or more other components may be added in the electronic device 301. In example embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. For example, as at least part of the data processing or computation, the processor 320 may load a command or data received from another component (e.g., the sensor module 376 or the communication module 390) in a volatile memory 332, process the command or the data stored in the volatile memory 332, and store resulting data in a nonvolatile memory 334. In example embodiments, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). In example embodiments, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 and/or the nonvolatile memory 334.

The program 340 may be stored in the memory 330 as software, and may include, for example, an operating system (OS) 342, middleware 344, and/or an application 346.

The input device 350 may receive a command or data to be used by another component (e.g., the processor 320) of the electronic device 301, from the outside (e.g., a user) of the electronic device 301. The input device 350 may include, for example, a microphone, a mouse, a keyboard, and/or a digital pen (e.g., a stylus pen).

The sound output device 355 may output sound signals to the outside of the electronic device 301. The sound output device 355 may include, for example, a speaker and/or a receiver. The speaker may be used for general purposes, such as playing multimedia or playing recorded audio, and the receiver may be used for an incoming calls. In example embodiments, the receiver may be implemented as separate from, or as part of the speaker.

The display device 360 may visually provide information to the outside (e.g., a user) of the electronic device 301. The display device 360 may include, for example, a display, a hologram device, and/or a projector, and control circuitry to control a corresponding one of the display, hologram device, and/or projector. In example embodiments, the display device 360 may include touch circuitry adapted to detect a touch, and/or sensor circuitry (e.g., a pressure sensor) adapted to measure the intensity of force incurred by the touch.

The audio module 370 may convert a sound into an electrical signal and vice versa. In example embodiments, the audio module 370 may obtain the sound via the input device 350, and/or output the sound via the sound output device 355 and/or a headphone of an external electronic device (e.g., an electronic device 302) directly (e.g., wired) and/or wirelessly coupled with the electronic device 301.

The sensor module 376 may detect an operational state (e.g., power and/or temperature) of the electronic device 301 or an environmental state (e.g., a state of a user) external to the electronic device 301, and then generate an electrical signal or data value corresponding to the detected state. In example embodiments, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 377 may support one or more specified protocols to be used for the electronic device 301 to be coupled with the external electronic device (e.g., the electronic device 302) directly (e.g., wired) or wirelessly. In example embodiments, the interface 377 may include, for example, a high definition multimedia interface (HDMI), a universal serial bus (USB) interface, a secure digital (SD) card interface, and/or an audio interface.

A connecting terminal 378 may include a connector via which the electronic device 301 may be physically connected with the external electronic device (e.g., the electronic device 302). In example embodiments, the connecting terminal 378 may include, for example, a HDMI connector, a USB connector, a SD card connector, and/or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. In example embodiments, the haptic module 379 may include, for example, a motor, a piezoelectric element, and/or an electric stimulator.

The camera module 380 may capture a still image and/or moving images. In example embodiments, the camera module 380 may include one or more lenses, image sensors, image signal processors, and/or flashes.

The power management module 388 may manage power supplied to the electronic device 301. In example embodiments, the power management module 388 may be implemented as at least part of, for example, a power management integrated circuit (PMIC).

The battery 389 may supply power to at least one component of the electronic device 301. In example embodiments, the battery 389 may include, for example, a primary cell which is not rechargeable, a secondary cell which is rechargeable, and/or a fuel cell.

The communication module 390 may support establishing a direct (e.g., wired) communication channel and/or a wireless communication channel between the electronic device 301 and the external electronic device (e.g., the electronic device 302, the electronic device 304, and/or the server 308) and performing communication via the established communication channel. The communication module 390 may include one or more communication processors that are operable independently from the processor 320 (e.g., the application processor (AP)) and supports a direct (e.g., wired) communication and/or a wireless communication. In example embodiments, the communication module 390 may include a wireless communication module 392 (e.g., a cellular communication module, a short-range wireless communication module, and/or a global navigation satellite system (GNSS) communication module) and/or a wired communication module 394 (e.g., a local area network (LAN) communication module and/or a power line communication (PLC) module). A corresponding one of these communication modules may communicate with the external electronic device via the first network 398 (e.g., a short-range communication network, such as Bluetooth™, wireless-fidelity (Wi-Fi) direct, and/or infrared data association (IrDA)) or the second network 399 (e.g., a long-range communication network, such as a cellular network, the Internet, and/or a computer network (e.g., LAN and/or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

In example embodiments, the wireless communication module 392 included in the communication module 390 may include (e.g., be used by) the beamformer device and the beamformee device according to example embodiments, and may perform the beamforming feedback method according to example embodiments. For example, each of the wireless communication module 392 included in the electronic device 301 and a wireless communication module (not illustrated) included in the electronic device 304 may include (e.g., may correspond to, implement, etc.) the beamformee device 200 and the beamformer device 100 in FIG. 1, and the second network 399 formed between the electronic devices 301 and 304 may correspond to the channel between the beamformee device 200 and the beamformer device 100 in FIG. 1. The beamformee device 200 included in the electronic device 301 may communicate with the beamformer device 100 included in the electronic device 304, and may perform the beamforming feedback with the subcarrier grouping and/or the codebook size selection in real-time according to example embodiments. Similarly, the beamformee device 200 included in the electronic device 304 may communicate with the beamformer device 100 included in the electronic device 301, and may perform the beamforming feedback with the subcarrier grouping and/or the codebook size selection in real-time according to example embodiments.

The antenna module 397 may transmit or receive a signal, or power, to or from the outside (e.g., the external electronic device) of the electronic device 301. In example embodiments, the antenna module 397 may include an antenna including a radiating element composed of a conductive material or a conductive pattern formed in or on a substrate (e.g., PCB). In example embodiments, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted and/or received between the communication module 390 and the external electronic device via the selected at least one antenna. In example embodiments, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), and/or mobile industry processor interface (MIPI)).

In example embodiments, commands or data may be transmitted or received between the electronic device 301 and the external electronic device 304 via the server 308 coupled with the second network 399. Each of the electronic devices 302 and 304 may be a device of a same type as, or a different type, from the electronic device 301. In example embodiments, all or some of operations to be executed at the electronic device 301 may be executed at one or more of the external electronic devices 302, 304 or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

The electronic device according to example embodiments may be one of various types of electronic devices. The electronic devices may include, for example, a portable communication device (e.g., a smartphone), a computer device, a portable multimedia device, a portable medical device, a camera, a wearable device, and/or a home appliance. In example embodiments, the electronic devices are not limited to those described above.

A tradeoff exists between the efficiency of beamforming feedback and degradation of communication performance. For example, as an amount of data included in the beamforming feedback increases, communication performance degradation and beamforming feedback efficiency are reduced. Also, as the amount of data included in the beamforming feedback decreases, communication performance degradation and beamforming feedback efficiency are increased. Varying conditions of a communication channel also influence the amount of communication performance degradation. Conventional wireless devices perform beamforming feedback according to fixed grouping size and codebook size values. The fixed grouping size and codebook size values of the conventional wireless devices result in a fixed amount of data included in the beamforming feedback. Accordingly, the conventional wireless devices do not adaptively select the amount of data included in the beamforming feedback according to the conditions of the communication channel. Thus, as these conditions vary, the conventional wireless devices provide insufficient beamforming feedback efficiency (e.g., excessive resource consumption, such as, processor, memory, power, delay, etc.) and excessive communication performance degradation (e.g., insufficient signal quality, disconnections, etc.).

However, according to example embodiments, improved wireless devices are provided. For example, the improved wireless devices may adaptively select the grouping size value and/or codebook size value, and thus, the amount of data included in the beamforming feedback, according to the conditions of the communication channel. Accordingly, the improved wireless devices overcome the deficiencies of the conventional wireless devices to increase beamforming feedback efficiency (e.g., reduce resource consumption, such as, processor, memory, power, delay, etc.) while maintaining sufficient communication performance (e.g., sufficient signal quality, connection reliability, etc.).

According to example embodiments, operations described herein as being performed by the wireless communication system 10, the beamformer device 100, the beamformee device 200, the channel estimator 210, the grouping size selector 220, the feedback unit 230, the SNR estimator 240, the SVD unit 232, the compression unit 234, the measurer 222, the selector 224, the wireless communication system 12, the beamformee device 202, the codebook size selector 250, the measurer 252, the selector 254, the wireless communication system 14, the beamformee device 204, the network environment 300, the electronic device 301, the electronic device 302, the electronic device 304, the server 308, the processor 320, the main processor 321, the auxiliary processor 323, the audio module 370, the power management module 388, the communication module 390, the wireless communication module 392 and/or the wired communication module 394 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. According to example embodiments, the look-up table 226 and/or the look-up table 256 may be stored in the non-transitory computer-readable medium.

It should be appreciated that example embodiments of the present disclosure and the terms used therein are not intended to limit the technological features set forth herein to particular examples and include various changes, equivalents, or replacements for a corresponding example. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum (or smallest) unit or part thereof, adapted to perform one or more functions. For example, according to example embodiments, the module may be implemented in a form of an application-specific integrated circuit (ASIC).

Example embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In example embodiments, the method may be included and provided in a computer program product. The computer program product may be traded as a product between a seller and a buyer. The computer program product may be distributed in the form of a non-transitory machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the non-transitory machine-readable storage medium, such as memory of the manufacturer's server, a server of the application store, or a relay server.

In example embodiments, each component (e.g., a module or a program) of the above-described components may include a single entity or multiple entities. In example embodiments, one or more of the above-described components may be omitted, or one or more other components may be added. Alternatively or additionally, a plurality of components (e.g., modules or programs) may be integrated into a single component. In such a case, according to example embodiments, the integrated component may still perform one or more functions of each of the plurality of components in the same or similar manner as they are performed by a corresponding one of the plurality of components before the integration. In example embodiments, operations performed by the module, the program, or another component may be carried out sequentially, in parallel, repeatedly, or heuristically, or one or more of the operations may be executed in a different order or omitted, or one or more other operations may be added.

The inventive concepts may be applied to various communication devices and systems that perform the beamforming and various electronic devices and systems that include the communication devices and systems. For example, the inventive concepts may be applied to systems such as a personal computer (PC), a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc. According to example embodiments, each of the beamformer device 100, the beamformee device 200, the beamformee device 202 and/or the beamformee device 204 may be implemented using a personal computer (PC), a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although example embodiments have been described, those skilled in the art will readily appreciate that many modifications are possible without materially departing from the novel teachings and advantages of example embodiments. Accordingly, all such modifications are intended to be included within the scope of example embodiments as defined in the claims. Therefore, it is to be understood that the foregoing is illustrative of example embodiments and is not to be construed as limited to the specific examples disclosed, and that modifications to the disclosed examples, as well as other examples, are intended to be included within the scope of the appended claims.

What is claimed is:

1. A beamformee device comprising:
processing circuitry configured to,
obtain channel information associated with a plurality of subcarriers based on a null data packet (NDP) received through a channel from a beamformer device,
estimate a signal-to-noise ratio (SNR) of the channel,
measure a variation on a frequency of the channel based on the channel information,
select at least one threshold value based on the SNR,
determine a grouping size value based on the at least one threshold value and the variation,
select one or more first subcarriers among the plurality of subcarriers based on the grouping size value,
select first channel information among the channel information based on the one or more first subcarriers,
generate a beamforming feedback report based on the first channel information, and
transmit the beamforming feedback report to the beamformer device.

2. The beamformee device of claim 1, wherein the processing circuitry is configured to:
measure the variation in real-time; and
select or update the grouping size value in real-time based on the variation.

3. The beamformee device of claim 1, wherein the processing circuitry is configured to:
measure the variation in real-time; and
select or update the grouping size value in real-time based on the at least one threshold value and the variation.

4. The beamformee device of claim 3, wherein the processing circuitry is configured to measure the variation by calculating a variance of the frequency of the channel.

5. The beamformee device of claim 4, wherein processing circuitry is configured to calculate the variance of the frequency of the channel based on Equation 1 as follows:

$$\sigma_H^2 = \frac{1}{N_r N_t} \sum_{i=0}^{N_r-1} \sum_{j=0}^{N_t-1} \left[ \frac{1}{N} \sum_{k=0}^{N-1} |\hat{H}_k(i,j)|^2 - \left( \frac{1}{N} \sum_{k=0}^{N-1} |\hat{H}_k(i,j)| \right)^2 \right],$$

[Equation 1]

wherein $\sigma_H^2$ denotes the variance of the frequency of the channel, $N_r$ denotes a number of antennas included in the beamformee device, $N_t$ denotes a number of antennas included in the beamformer device, N denotes a number of the plurality of subcarriers, $\hat{H}_k(i,j)$ denotes an (i,j)-th element in the channel information $\hat{H}_k$, and k denotes an index of the plurality of subcarriers.

6. The beamformee device of claim 4, wherein
the variation increases as the variance of the frequency of the channel increases; and
the variation decreases as the variance of the frequency of the channel decreases.

7. The beamformee device of claim 3, wherein the processing circuitry is configured to measure the variation by calculating a delay spread of the channel.

8. The beamformee device of claim 7, wherein the processing circuitry calculates the delay spread of the channel based on Equation 2 as follows:

$$\tau_H = \frac{1}{N_r N_t} \sum_{i=0}^{N_r-1} \sum_{j=0}^{N_t-1} [IDFT\{\phi_\Delta(i,j)\}],$$

[Equation 2]

where $\phi_\Delta(i,j), E\{\hat{H}_k^*(i,j)\hat{H}_{k+\Delta}(i,j)\}$ wherein τH denotes the delay spread of the channel, $N_r$ denotes a number of antennas included in the beamformee device, $N_t$ denotes a number of antennas included in the beamformer device, $\hat{H}_k(i,j)$ denotes an (i,j)-th element in the channel information $\hat{H}_k$, k denotes an index of the plurality of subcarriers, IDFT(·) denotes an inverse discrete Fourier transform (DFT) function, * denotes a complex conjugate operator, and E{.} denotes an arithmetic mean operator.

9. The beamformee device of claim 7, wherein
the variation increases as the delay spread of the channel increases; and
the variation decreases as the delay spread of the channel decreases.

10. The beamformee device of claim 3, wherein the processing circuitry is configured to:
determine the grouping size value to be smaller in response to the variation being larger; and
determine the grouping size value to be larger in response to the variation being smaller.

11. The beamformee device of claim 10, wherein the processing circuitry is configured to:
select the grouping size value in real-time.

12. The beamformee device of claim 11, wherein
the at least one threshold value includes a first threshold value; and
the processing circuitry is configured to:
select a first value as the grouping size value in response to determining that the variation is greater than the first threshold value, and
select a second value greater than the first value as the grouping size value in response to determining that the variation is less than or equal to the first threshold value.

13. The beamformee device of claim 11, wherein
the at least one threshold value includes a first threshold value and a second threshold value, the second threshold value being greater than the first threshold value; and
the processing circuitry is configured to:
select a first value as the grouping size value in response to determining that the variation is greater than the second threshold value;
select a second value greater than the first value as the grouping size value in response to determining that the variation,
is greater than the first threshold value, and
is less than or equal to the second threshold value; and
select a third value greater than the second value as the grouping size value in response to determining that the variation is less than or equal to the first threshold value.

14. The beamformee device of claim 1, wherein the processing circuitry is configured to:
perform a singular value decomposition (SVD) on the first channel information; and
generate the beamforming feedback report by compressing a result of the SVD.

15. The beamformee device of claim 14, wherein the beamforming feedback report includes media access control (MAC) header information, category information, multiple-input multiple-output (MIMO) control information, and compressed beamforming report (CBR) information, the CBR information being obtained by compressing the first channel information.

16. The beamformee device of claim 14, wherein the processing circuitry is configured to select every $N_g$-th subcarrier from among the plurality of subcarriers based on the grouping size value, where $N_g$ represents the grouping size value.

17. The beamformee device of claim 1, wherein the beamformee device is included in a wireless communication system based on a wireless local area network (WLAN).

18. A beamformee device comprising:
processing circuitry configured to,
obtain channel information associated with a plurality of subcarriers based on a null data packet (NDP) received through a channel from a beamformer device,
estimate an SNR of the channel,
measure a variation on a frequency of the channel in real-time based on the channel information including calculating at least one of a variance of the frequency of the channel or a delay spread of the channel,
select at least one threshold value based on the SNR,
determine a grouping size value based on the at least one threshold value and the variation,
select one or more first subcarriers among the plurality of subcarriers based on the grouping size value,
select first channel information among the channel information based on the one or more first subcarriers,
perform a singular value decomposition (SVD) on the first channel information,
generate a beamforming feedback report by compressing a result of the SVD, and
transmit the beamforming feedback report to the beamformer device.

19. A beamformee device comprising:
processing circuitry configured to,
obtain channel information associated with a plurality of subcarriers based on a null data packet (NDP) received through a channel from a beamformer device,
estimate a signal-to-noise ratio (SNR) of the channel,
measure a variation on a frequency of the channel based on the channel information,
select at least one threshold value based on the SNR,
determine a codebook size value based on the at least one threshold value and the variation,
generate a beamforming feedback report based on the codebook size value and the channel information, and
transmit the beamforming feedback report to the beamformer device.

20. The beamformee device of claim 19, wherein processing circuitry is configured to:
measure the variation in real-time based on the channel information; and
select or update the codebook size value in real-time based on the variation.

* * * * *